United States Patent
Chen et al.

(10) Patent No.: US 12,165,275 B2
(45) Date of Patent: *Dec. 10, 2024

(54) FACE AUGMENTATION IN VIDEO

(71) Applicant: Tahoe Research, Ltd., Dublin (IE)

(72) Inventors: Ke Chen, Cupertino, CA (US); Zhipin Deng, Beijing (CN); Xiaoxia Cai, Beijing (CN); Chen Wang, Beijing (CN); Ya-Ti Peng, Sunnyvale, CA (US); Yi-Jen Chiu, San Jose, CA (US); Lidong Xu, Beijing (CN)

(73) Assignee: Tahoe Research, Ltd., Dublin (IE)

( * ) Notice: Subject to any disclaimer, the term of this patent is extended or adjusted under 35 U.S.C. 154(b) by 0 days.

This patent is subject to a terminal disclaimer.

(21) Appl. No.: 18/456,845

(22) Filed: Aug. 28, 2023

(65) Prior Publication Data

US 2023/0401807 A1    Dec. 14, 2023

Related U.S. Application Data

(63) Continuation of application No. 17/388,946, filed on Jul. 29, 2021, now Pat. No. 11,741,682, which is a
(Continued)

(51) Int. Cl.
*G06T 19/20*   (2011.01)
*G06T 5/00*   (2024.01)
(Continued)

(52) U.S. Cl.
CPC ............... *G06T 19/20* (2013.01); *G06T 5/00* (2013.01); *G06T 7/90* (2017.01); *G06T 15/005* (2013.01);
(Continued)

(58) Field of Classification Search
None
See application file for complete search history.

(56) References Cited

U.S. PATENT DOCUMENTS 11,308,538 B1 * 4/2022 Pineau ............... G06Q 30/0282
2003/0223622 A1  12/2003 Simon et al.
(Continued)

FOREIGN PATENT DOCUMENTS

CN   103685926 A    3/2014
JP   2010-219740 A  9/2010
WO   2015/089436 A1 6/2015

OTHER PUBLICATIONS

Digital Beauty The good, the bad, and the (not-so) ugly. Corcoran et al. (Year: 2014).
(Continued)

*Primary Examiner* — Delomia L Gilliard
(74) *Attorney, Agent, or Firm* — Studebaker & Brackett PC

(57) ABSTRACT

Systems, apparatus, articles of manufacture and methods for face augmentation in video are disclosed. An example apparatus includes executable code to detect a face of a subject in the video, detect a gender of the subject based on the face, detect a skin tone of the subject based on the face, apply a first process to smooth skin on the face in the video, apply a second process to change the skin tone of the face, apply a third process to slim the face, apply a fourth process to adjust a size of eyes on the face, and apply a fifth process to remove an eye bag from the face. One or more of the first process, the second process, the third process, the fourth process, or the fifth process adjustable based on one or more of the gender or an age. The example apparatus also includes one or more processors to generate modified video with beauty effects, the beauty effects based on one or more of the first process, the second process, the third process, the fourth process, or the fifth process.

20 Claims, 18 Drawing Sheets

Related U.S. Application Data continuation of application No. 16/658,803, filed on Oct. 21, 2019, now Pat. No. 11,328,496, which is a continuation of application No. 15/127,785, filed as application No. PCT/CN2015/089433 on Sep. 11, 2015, now Pat. No. 10,453,270.

(51) Int. Cl.
  *G06T 7/90*    (2017.01)
  *G06T 15/00*   (2011.01)
  *G06V 40/16*   (2022.01)

(52) U.S. Cl.
  CPC .......... *G06V 40/161* (2022.01); *G06V 40/168* (2022.01); *G06T 2207/10016* (2013.01); *G06T 2207/10024* (2013.01); *G06T 2207/20028* (2013.01); *G06T 2207/30201* (2013.01)

(56) References Cited

U.S. PATENT DOCUMENTS

| | | |
|---|---|---|
| 2006/0184800 A1 | 8/2006 | Rosenberg |
| 2008/0300010 A1 | 12/2008 | Border et al. |
| 2011/0002506 A1 | 1/2011 | Ciuc et al. |
| 2012/0051658 A1 | 3/2012 | Tong et al. |
| 2012/0208592 A1 | 8/2012 | Davis et al. |
| 2012/0223956 A1* | 9/2012 | Saito .................... G06F 3/0481 382/284 |
| 2012/0313937 A1 | 12/2012 | Beeler et al. |
| 2013/0321700 A1 | 12/2013 | Cote et al. |
| 2013/0322753 A1 | 12/2013 | Lim et al. |
| 2013/0329079 A1 | 12/2013 | Florea et al. |
| 2014/0044359 A1 | 2/2014 | Rousson |
| 2014/0063061 A1 | 3/2014 | Reitan |
| 2014/0085501 A1 | 3/2014 | Tran |
| 2014/0341422 A1 | 11/2014 | Xiong et al. |
| 2014/0369554 A1 | 12/2014 | Albuz et al. |
| 2015/0002537 A1 | 1/2015 | Samvik et al. |
| 2015/0042664 A1 | 2/2015 | Currid et al. |
| 2015/0339757 A1* | 11/2015 | Aarabi ............... G06Q 30/0631 705/26.7 |
| 2016/0048949 A1 | 2/2016 | Peng et al. |
| 2016/0065856 A1 | 3/2016 | Sohn et al. |
| 2017/0011210 A1 | 1/2017 | Cheong et al. |
| 2017/0109571 A1 | 4/2017 | McDuff et al. |
| 2018/0174370 A1 | 6/2018 | Chen et al. |
| 2018/0276869 A1 | 9/2018 | Matts et al. |
| 2018/0276883 A1 | 9/2018 | D'Alessandro et al. |
| 2019/0206031 A1 | 7/2019 | Kim et al. |
| 2020/0151964 A1 | 5/2020 | Chen et al. |
| 2020/0170564 A1 | 6/2020 | Jiang et al. |

OTHER PUBLICATIONS

Video Face Beautification. Zhao et al.(Year: 2014).
International Searching Authority, "International Search Report," mailed in connection with International Patent Application No. PCT/CN2015/089433, on May 27, 2016, 4 pages.
International Searching Authority, Written Opinion, mailed in connection with International Patent Application No. PCT/CN2015/089433, on May 27, 2016, 4 pages.
United States Patent and Trademark Office, "Notice of Allowance," mailed in connection with U.S. Appl. No. 15/127,785, on Jun. 12, 2019, 9 pages.
United States Patent and Trademark Office, "Final Office Action," mailed in connection with U.S. Appl. No. 15/127,785, on Mar. 29, 2019, 24 pages.
United States Patent and Trademark Office, "Non-final Office Action," mailed in connection with U.S. Appl. No. 15/127,785, on Sep. 21, 2018, 23 pages.
United States Patent and Trademark Office, "Non-final Office Action," mailed in connection with U.S. Appl. No. 16/658,803, on May 27, 2021, 17 pages.

* cited by examiner

FACE AUGMENTATION IN VIDEO

RELATED APPLICATIONS

This application is a Continuation of U.S. patent application Ser. No. 17/388,946, filed Jul. 29, 2021, which is a Continuation of U.S. patent application Ser. No. 16/658,803, filed Oct. 21, 2019, issued as U.S. Pat. No. 11,328,496 on May 10, 2022, which is a Continuation of U.S. patent application Ser. No. 15/127,785, filed Sep. 20, 2016, issued as U.S. Pat. No. 10,453,270 on Oct. 22, 2019, which is the U.S. National Stage of International Application No. PCT/CN2015/089433, filed Sep. 11, 2015, the entire contents of which are incorporated herein by reference.

BACKGROUND

When taking still images, users might desire for some levels of control over their appearance. Such desire has led to face beautification apps being one of the most popular apps for smart phones.

Video sharing and conferencing has been increasingly used with the pervasive usage of smart phone. However, many of the existing apps for smart phones are designed for off-line image processing or might not work without limited features in a video mode.

BRIEF DESCRIPTION OF THE DRAWINGS

The material described herein is illustrated by way of example and not by way of limitation in the accompanying figures. For simplicity and clarity of illustration, elements illustrated in the figures are not necessarily drawn to scale. For example, the dimensions of some elements may be exaggerated relative to other elements for clarity. Further, where considered appropriate, reference labels have been repeated among the figures to indicate corresponding or analogous elements. In the figures.

DETAILED DESCRIPTION

Figure 1:
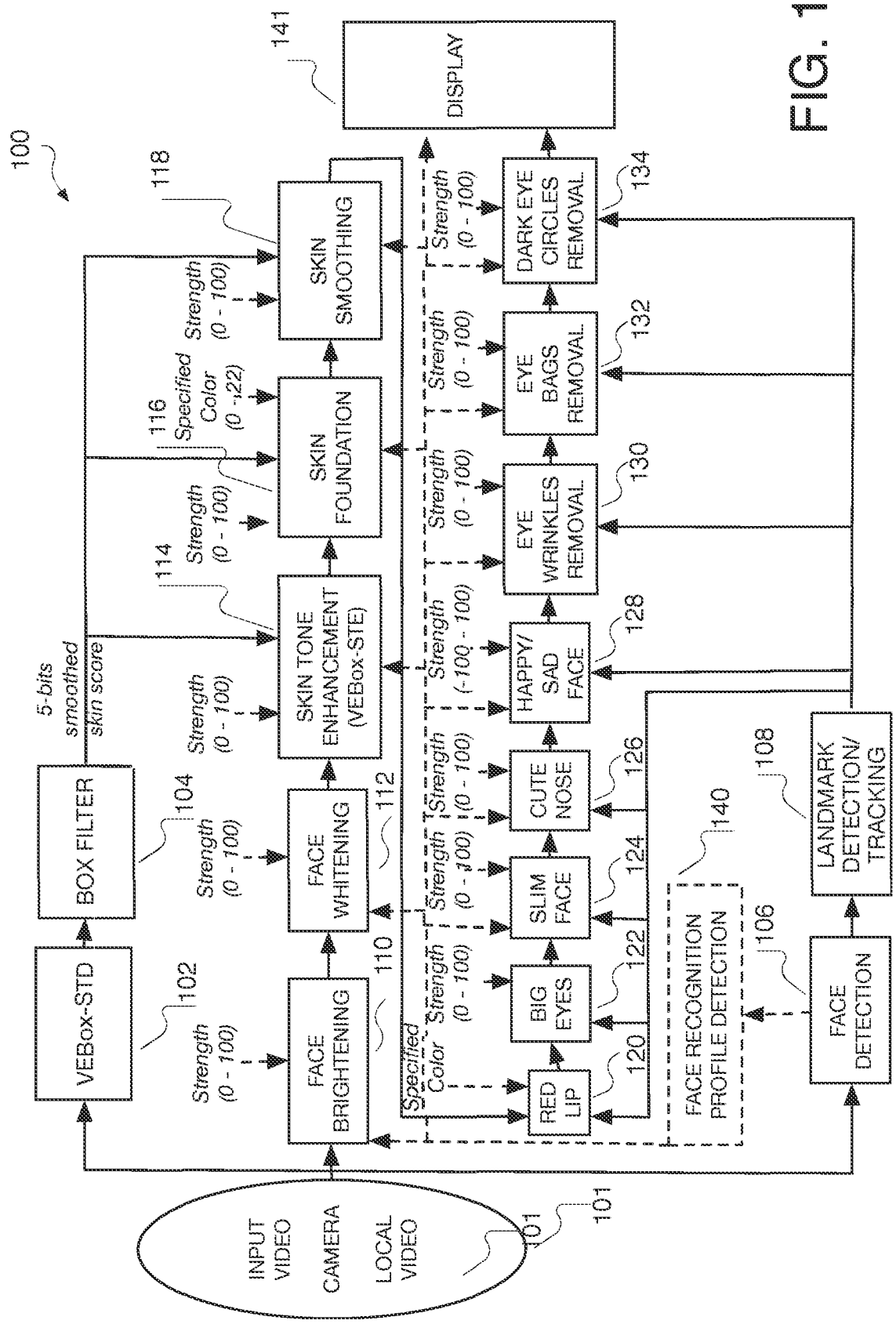
FIG. 1 is an illustrative diagram of an example face beautification (FB) video augmentation pipe.

While the following description sets forth various implementations that may be manifested in architectures such system-on-a-chip (SoC) architectures for example, implementation of the techniques and/or arrangements described herein are not restricted to particular architectures and/or computing systems and may be implemented by any architecture and/or computing system for similar purposes. For instance, various architectures employing, for example, multiple integrated circuit (IC) chips and/or packages, and/or various computing devices and/or consumer electronic (CE) devices such as set top boxes, smart phones, etc., may implement the techniques and/or arrangements described herein. Further, while the following description may set forth numerous specific details such as logic implementations, types and interrelationships of system components, logic partitioning/integration choices, etc., claimed subject matter may be practiced without such specific details. In other instances, some material such as, for example, control structures and full software instruction sequences, may not be shown in detail in order not to obscure the material disclosed herein.

The material disclosed herein may be implemented in hardware, firmware, software, or any combination thereof. The material disclosed herein may also be implemented as instructions stored on a machine-readable medium, which may be read and executed by one or more processors. A machine-readable medium may include any medium and/or mechanism for storing or transmitting information in a form readable by a machine (e.g., a computing device). For example, a machine-readable medium may include read only memory (ROM); random access memory (RAM); magnetic disk storage media; optical storage media; flash memory devices; electrical, optical, acoustical or other forms of propagated signals (e.g., carrier waves, infrared signals, digital signals, etc.), and others.

References in the specification to "one implementation", "an implementation", "an example implementation", etc., indicate that the implementation described may include a particular feature, structure, or characteristic, but every implementation may not necessarily include the particular feature, structure, or characteristic. Moreover, such phrases are not necessarily referring to the same implementation. Further, when a particular feature, structure, or characteristic is described in connection with an implementation, it is submitted that it is within the knowledge of one skilled in the art to effect such feature, structure, or characteristic in connection with other implementations whether or not explicitly described herein.

Systems, apparatus, articles, and methods are described below including operations for scalable real-time face beautification of video images.

As described above, video sharing and conferencing has been increasingly used with the pervasive usage of smart phone. However, many of the existing apps for smart phones are designed for off-line image processing or might not work without limited features in a video mode.

However, as will be described in greater detail below, some of the implementations described herein may present a Face Beautification (FB) pipe capable of reaching real-time performance (e.g., HD video @ 30 fps) on a graphics processing unit (GPU) with rich feature set. Platforms (such as iPhone, iPad . . . etc.) that might not use such an enabled GPU, a cloud-based face beautification (FB) solution with low power consumption is proposed where the low power capability is achieved by customizing virtual graphics devices on servers with similar GPUs including such a face beautification (FB) pipe.

Some of the implementations described herein may present a complete face beautification pipe. The analytic information utilized in such a FB pipe may include face shape, facial landmark points and a skin tone score. The pipe may combine information of face shape, facial landmark points and skin tone score and may utilize a GPU sampler engine fully.

Given limited compute resource available on mobile platforms, the FB pipe presented here can still achieve real-time performance on HD-resolution video with a rich processing feature set on mobile platform.

The FB pipe is an intelligent FB solution where customized processing is embedded. That is, the features with corresponding levels of processing to be applied to users may be differentiated by gender/age/racial under different environments are selected automatically and visually suitable/pleasant augmented results are obtained.

Furthermore, by customizing the virtual graphics devices on a server utilizing similar GPUs including such a face beautification (FB) pipe, some of the implementations described herein may demonstrate a cloud-based face beautification solution for platforms that do not themselves have GPUs including such a face beautification (FB) pipe.

For example, some of the implementations described herein may present a cloud-based FB solution with low power consumption with the idea of customizing the virtual graphics device on the server side. The low power server configuration may be generalized to other usages such as transcoding, video summarization, gaming, etc.

FIG. 1 illustrates diagram of a face beautification (FB) video augmentation pipe 100 (the features set are not limited by this diagram). The whole pipe 100 is deployed on a graphics processor (e.g., with GPGPU kernels and GPU fixed function). As illustrated, the beautification features in video augmentation pipe 100 may be based on analytic information of skin-tone likelihood/score or facial landmark points. The whole process can be split to five areas: video pre-processing, application of skin tone based filters, application of facial landmark based filters, face recognition/profile detection filter, and display of the processed video and/or encoding for transmission.

In video pre-processing, the input video 101 (captured by camera or video clip) is firstly sent to the GPU video augmentation pipe 100 for skin tone detection (see VEBox-STD 102 and box filter 104) as well as facial shape/feature extraction (face detection 106 and landmark detection 108). The skin tone detection may be done on GPU fixed function (video enhancement box 102). At the same time, the facial shape/feature extraction kernels 106/108 (GPGPU kernel) may be dispatched to execution unit on GPU.

In the application of skin tone based filters, skin tone based filters may include face brightening 110, face whitening 112, skin tone enhancement 114, skin foundation 116, skin smoothing 118, the like, and/or combinations thereof (Note: the feature set may be expanded and/or the order of this feature set might be changed). The processed skin tone map from skin tone detection and box filter modules 102/104 will be consumed by these filters. Algorithm flow charts of skin foundation filter 116 and skin smoothing filter 118 are illustrated below.

In the application of facial landmark based filters, the landmark based filters include red lip filter 120, big eyes filter 122, slim face filter 124, cute nose filter 126, happy/sad face filter 128, eye wrinkle remover filter 130, eye bags remover filter 132, dark eye circles remover filter 134, the like, and/or combinations thereof. Algorithm flow charts of the algorithm flow charts of red lip filter 120, big eyes filter 122, slim face filter 124 are illustrated below.

The face recognition/profile detection filter 140 may be optional. If face recognition/profile detection filter 140 is turned on, face recognition/profile detection will be used to customize the feature set. For example, when gender detection is on, red lip filter 120 may be turned off for male. Further, when face recognition/profile detection filter 140 is on, a user may be able to customize the setting (filter on/off, filter strength, etc.) and save the configuration for future use. That is, the features with corresponding levels of processing to be applied to users may be differentiated by gender/age/racial under different environments are selected automatically and visually suitable/pleasant augmented results are obtained.

The processed picture 141 may be shown on a display and/or encoded and transmitted.

In operation, the video augmentation pipe 100 may leverage existing fixed-function STDE hardware (e.g., Skin Tone Detection and Enhancement 102 module) on a GPU, which may be low-power and high-performance to generate the skin-tone likelihood. For further information of such STDE hardware (e.g., Skin Tone Detection and Enhancement module), e.g., please refer to U.S. Pat. No. 8,493,402, filed Jan. 6, 2011, and titled "System, method and computer program product for color processing of point-of-interest color".

The generation of facial landmark points, on the other hand, may leverages both a face detector, e.g., please refer to PCT Application No. PCT/CN2014/075165, filed Apr. 11, 2014, entitled "OBJECT DETECTION USING DIRECTIONAL FILTERING", and fixed-function hardware (e.g., Convolution Filter), e.g., please refer to PCT Application No. PCT/CN2012/086840, filed Dec. 18, 2012, entitled "HARDWARE CONVOLUTION PRE-FILTER TO ACCELERATE OBJECT DETECTION", for the face detection 106 task, which may be performed prior to facial landmark 108 detection. The face detection 106 approach taken here can achieve fast-compute and low-power target while maintaining excellent detection accuracy.

Furthermore, a light-weight compute of facial landmark validation step may be embedded in the facial landmark 108 generation block to intelligently switch between detection and tracking mode. This automatic switch between tracking and detection mode may help reduce the compute while maintaining good accuracy in terms of locating facial landmark.

Some of the implementations described herein may combine GPU based face detection, skin tone detection, facial landmark detection and fully utilizes GPU hardware (e.g., Sampler engine, EU, Fixed Function, etc.) to build one power efficient real-time face beautification pipe on HD-resolution video.

For example, in experiments run at HD (1280×720) on an Intel GPU @400 MHz, a face beautification video augmentation pipe 100, as described herein, achieve real-time (e.g., 30 fps) on HD video with very low CPU utilization and can use multiple face beautification filters simultaneously.

Additional details regarding the functioning of face beautification (FB) video augmentation pipe 100 are illustrated below with regard to FIG. 2.

Figure 2:
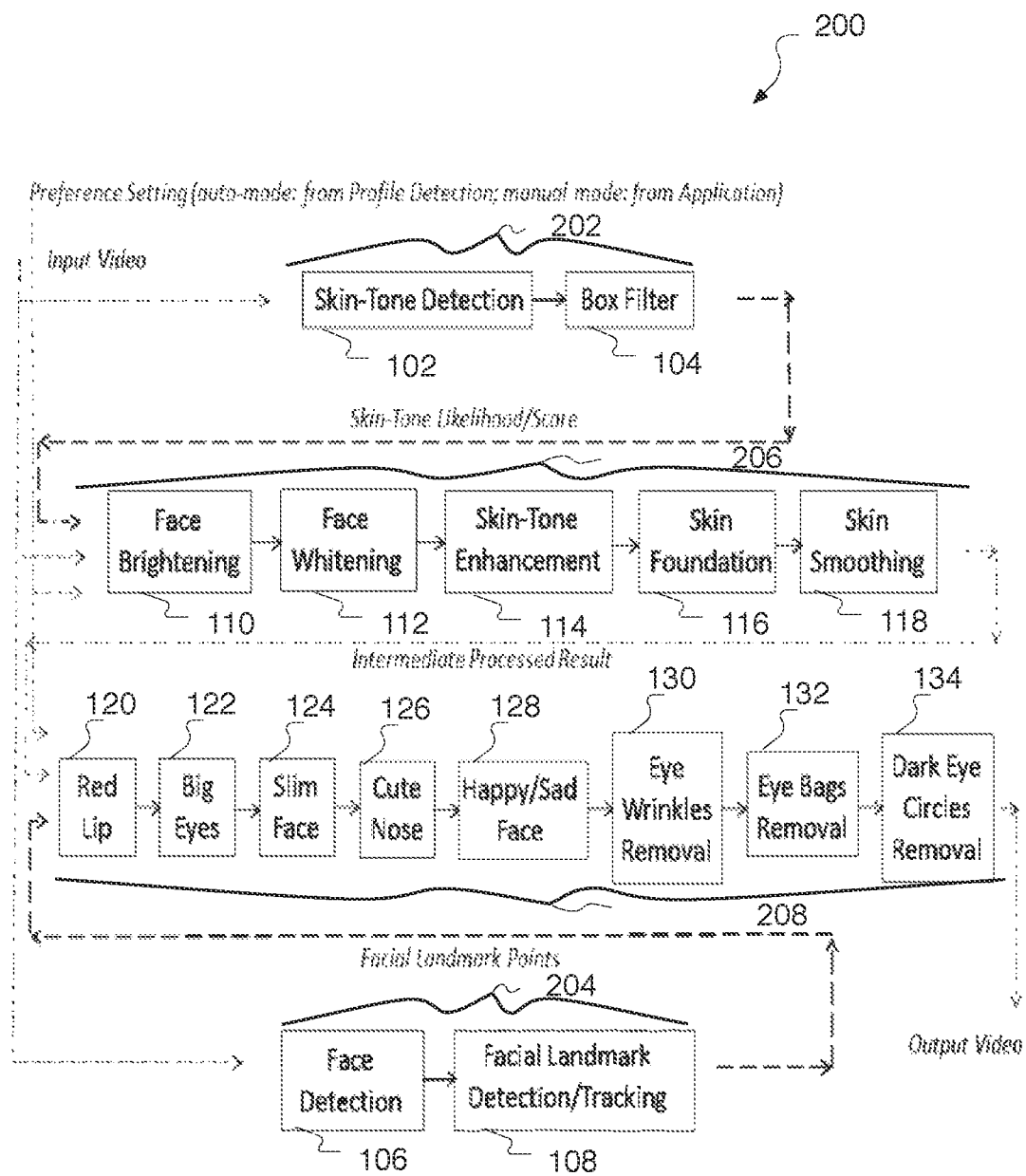
FIG. 2 is an illustrative diagram of an example flow diagram of face based video augmentation on a graphics processor.

FIG. 2 illustrates an example flow diagram 200 of face based video augmentation on a graphics processor. The blocks 202 and 204 represent the analytic components (e.g., a skin tone logic unit 202 to generate skin-tone likelihood/score and a facial feature logic unit 204 to generate facial landmark points) of the system; the blocks 206 represent the features utilizing skin-tone likelihood information while the blocks 208 represent the features utilizing the facial landmark information.

The Skin-Tone Detection (STD) 102 utilizes Video Enhancement Box (VEBox) Skin-Tone Detection and Enhancement (STDE) in a graphics processor to perform skin tone color detection for an input YUV data. The output of the STD contains is skin-tone likelihood score represented in 5-bit for each pixel within an input frame.

The input of the Box-Filter 104 is the skin-tone score result from Skin-Tone Detection (STD) 102 (e.g., VEBox). Box-Filter 104 performs averaging operation on the input skin-tone score to produce a smooth version of skin-tone likelihood score.

The Face Detection 106 takes YUV input and applies a pre-trained model, which only operates on Y-channel information to identify the appearance of human faces within an input frame. Face Detection 106 returns the location and size of each detected face. In some implementations, face detection 106 may be implemented as a combination of hardware and software solutions.

The Facial Landmark Detection/Tracking 108 takes YUV input and information of detected faces from the Face Detection 106. Facial Landmark Detection/Tracking 108 applies a pre-trained model on the rectangle area of each detected face to detect/track the locations of a set of pre-defined facial landmark points (e.g., point of corners of eyes, points of the corners of the lip . . . etc.). The output of the Facial Landmark Detection/Tracking 108 contains the locations of the set (e.g., N points) of facial landmark points.

The Face Brightening 110 takes YUV input data and performs adjustment on Y data based on the skin-tone likelihood/score information fed from the analytic module Skin-Tone Detection (STD) 102 to produce brightening effect of the input frame.

The Face Whitening 112 module takes YUV input data and blends the input with a white color map. The white color map is input content-adaptive and is generated within the Face Whitening 112 module. The blending of the input pixels and the white color map is per-pixel wise, adaptive to the Y value of each pixel.

The Skin-Tone-Enhancement (STE) 114 utilizes Skin-Tone Detection (STD) 102 (e.g., VEBox) to perform the saturation enhancement on the skin-tone-color pixels where the enhancement is adaptive to the skin-tone likelihood score.

The Skin Foundation 116 module takes YUV input data and blends the input with a user-selected foundation color where the per-pixel skin-tone likelihood score serves as the blending factor here.

The Skin Smoothing 118 takes YUV input data and adjusts all 3-channel information to produce a smooth version of the input.

The Red Lip 120 module takes YUV input data. With the facial landmark information fed into the Red Lip 120 module, the module identifies the lip area of the face if there is a face within the input frame. For input frame with detected faces, Red Lip 120 module further performs color modification for lip area so that a visually pleasant appearance of the users' lips can be obtained.

The Big Eyes 122 module takes YUV input data. With the facial landmark information fed into the Big Eyes 122 module and the users' preference of level of enlargement input from the Application, the Big Eyes 122 module internally derives the proper location within the face and the shape of the eyes users intend to have. Morphological warping is performed following to create the big eyes effect.

The Slim Face 124 module takes YUV input data. With the facial landmark information fed into the Slim Face 124 module and the users' preference of level of slim-face-effect input from the Application, the Slim Face 124 module internally derives the thinner-shape of the original face area and performs morphological warping to create the slim face effect.

The Cute Nose 126 module takes YUV input data. With the facial landmark information fed into the Cute Nose 126 module and the users' preference of level of adjustment input from the Application, the Cute Nose 126 module internally derives the modified shape of the nose area and performs morphological warping to create the narrower/cuter nose effect.

The Happy/Sad 128 module takes YUV input data. With the facial landmark information fed into the Happy/Sad 128 module and the users' preference of level of adjustment input from the Application, the Happy/Sad 128 module internally derives the modified shape of the mouth area and performs morphological warping to create the happy/sad face effect via changing the shape of users' mouths.

The Eye Wrinkles Removal 130 module takes YUV input data. Facial landmark information, rectangle region of the detected face, and Y-channel signal analysis are utilized by the Eye Wrinkles Removal 130 module to locate the area around eyes for processing. Once identifying the target area, a smoothing process is operated on YUV values for pixels within the area to create the wrinkles removal effect.

The Eye Bags Removal 132 module takes YUV input data. Facial landmark information and Y-channel signal analysis are utilized by the Eye Bags Removal 132 module to locate the eye bags regions for processing. Once identifying the regions, a smoothing process is operated on YUV values for pixels within the regions to create the eye bags removal effect.

The Dark Eye Circles Removal 134 block takes YUV input data. Facial landmark information and Y-channel signal analysis are utilized by the Dark Eye Circles Removal 134 to locate the eye bags region for processing. Once identifying the regions, a content-adaptive blending is performed to blend the original YUV values and a pre-defined color value for pixels within the eye bags region. The effect of removing dark eye circles is finally resulted.

The skin-tone enhancement feature 206 shown in FIG. 2 may leverage the existing fixed-function hardware (e.g., Skin Tone Detection and Enhancement 102 module) on a GPU, which is low-power and high-performance solution for color enhancement. Further, the facial landmark feature 208, specifically for all modules where warping operation is involved (e.g., Big Eyes, Slim Face, Cute Nose, Happy/Sad Face), may leverage a fixed-function sampler engine (see FIG. 3) on a GPU may be utilized to do the warping operation. With such an implementation of the skin-tone enhancement feature 206 and the facial landmark feature 208, the pipe 100 (see FIG. 1) with rich feature set for video mode can achieve high-performance and low-power target.

Figure 3:
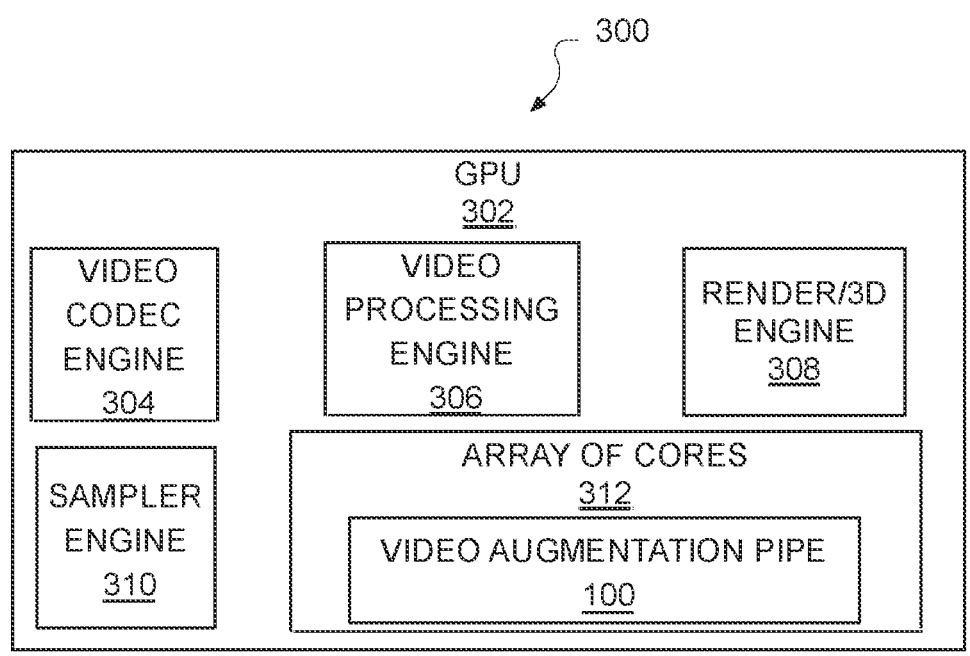
FIG. 3 is an illustrative diagram of an example face beautification (FB) video augmentation scheme implemented on a mobile platform GPU.

FIG. 3 illustrates an example face beautification (FB) video augmentation scheme 300 implemented on a mobile platform GPU 302. In the illustrated example, mobile platform Graphic Processing Unit (GPU) 302 may have several available hardware blocks (e.g., independent types of engines) with distinct functionalities. For example, GPU 302 may include video codec engine(s) 304, video processing engine(s) 306, render/3D engine 308, sampler engine 310, an array of cores 312, the like, and/or combinations thereof.

Video codec engine(s) 304 may perform video encoding/decoding. For example, video codec engine(s) 304 may include Decode Engines for video decoding and/or Encode Engines for video encoding.

Video processing engine(s) 306 may perform video pre-post-processing. For example, some parts of video augmentation pipe 100 (e.g. see skin tone detection VEBox-STD 102 and skin tone enhancement VEBox-STE 114 of FIG. 1) may be implemented via video processing engine(s) 306. Most of the rest of video augmentation pipe 100 may be implemented via array of cores 312, as illustrated.

Render/3D engine 308 in combination with array of cores 312 may perform rendering, gaming, the like, and/or combinations thereof.

Sampler engine 310 is a separate module (e.g., separate from video processing engine 306) inside GPU 302. For example, sampler engine 310 may be implemented as a hardware module to allow quick sampling access to get the pixels/texels from the original data map, and to allow quick filtering operations.

Figure 4:
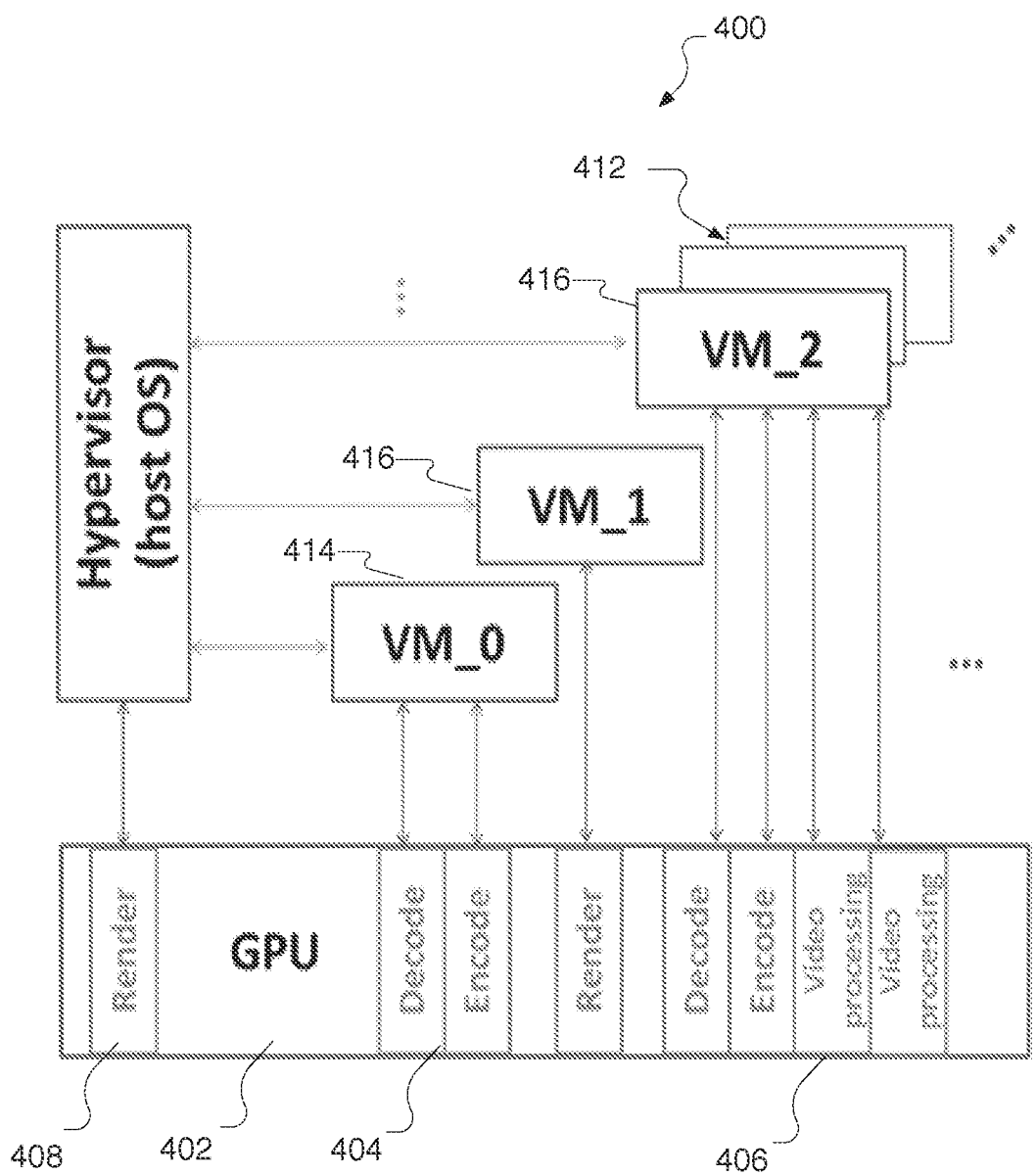
FIG. 4 is an illustrative diagram of an example flexible virtual GPU configuration implemented on a server platform GPU.

FIG. 4 illustrates an example of a flexible virtual GPU 400 configuration implemented on a sever platform GPU 402. In the illustrated example flexible virtual GPU 400 may include several virtual GPUs 412 (e.g., VM_0, VM_1, and VM_2) that share one physical GPU 402. In such an example, a first virtual GPU 414 (e.g., VM_0) may run a transcoding application, a second virtual GPU 416 (e.g., VM_1) may run a gaming application, while a third virtual GPU 416 (e.g., VM_2) may run a facial beautification application. Accordingly, sever platform GPU 402 may transfer input video images as well as output video images modified by the facial beatification operations described herein between one or more remote devices in communication with sever platform GPU 402.

Often, the type of chips used in servers and mobile devices differ. Accordingly, it may be advantageous to develop server chips that reproduce the functionality of chips for mobile devices. To serve users possessing mobile platforms not equipped with a facial beautification chip, a customized virtual graphics devices may be provide via a cloud-based facial beautification solution. This cloud-based facial beautification solution may have the advantage over power efficiency compared to other cloud-based FB solution which is purely CPU software solution.

In the illustrated example, server Graphic Processing Unit (GPU) 402 may have several available hardware blocks (e.g., independent types of engines) with distinct functionalities. For example, server GPU 402 may include the same and/or similar hardware blocks as mobile platform Graphic Processing Unit (GPU) 302 of FIG. 3. For example, server GPU 402 may include video codec engine(s) (not shown here), video processing engine(s) 406, render/3D engine(s) 408, sampler engine (not shown here), an array of cores (not shown here), the like, and/or combinations thereof. For any type of engines listed above, there may be multiple instances included in the GPU 402.

With the emerging of Virtual Desktop Infrastructure (VDI) and general-purpose computing on graphics processing units (GPGPU), GPU virtualization technology may be implemented in cloud computing. In such kind of usage scenarios, one powerful physical GPU 402 on the cloud side may be shared by multiple Virtual Machines (VMs) 412. Note that from a VM's 412 point of view, VMs 412 exclusively owns the virtual graphics device.

Further, as one can see from FIG. 4, the proposed flexible virtual GPU 400 configuration is not limited to face beautification workload in terms of its application. Instead, flexible virtual GPU 400 configuration can be easily applied to cover other workloads such as GPGPU, transcoding, the like, and/or combinations thereof.

The proposed cloud-based facial beautification solution has advantages of both performance and power efficiency compared to others due to two distinct system-wise factors. First, the flexible virtual GPU 400 configuration allows for utilization of GPU instead of CPU; thus better performance may be achieved. Second, the flexible virtual GPU 400 configuration allows for utilization of virtual graphics devices to allow for sharing of the GPU with other workloads; thus a minimum of power leak may be achieved.

FIGS. 5-9, described in greater detail below, may apply skin tone based filters. Skin tone based filters. Such skin tone based filters may include face brightening, face whitening, skin tone enhancement, skin foundation and skin smoothing, the like, and/or combinations thereof. The processed skin tone map from discussed above may be consumed by these filters.

Figure 5:
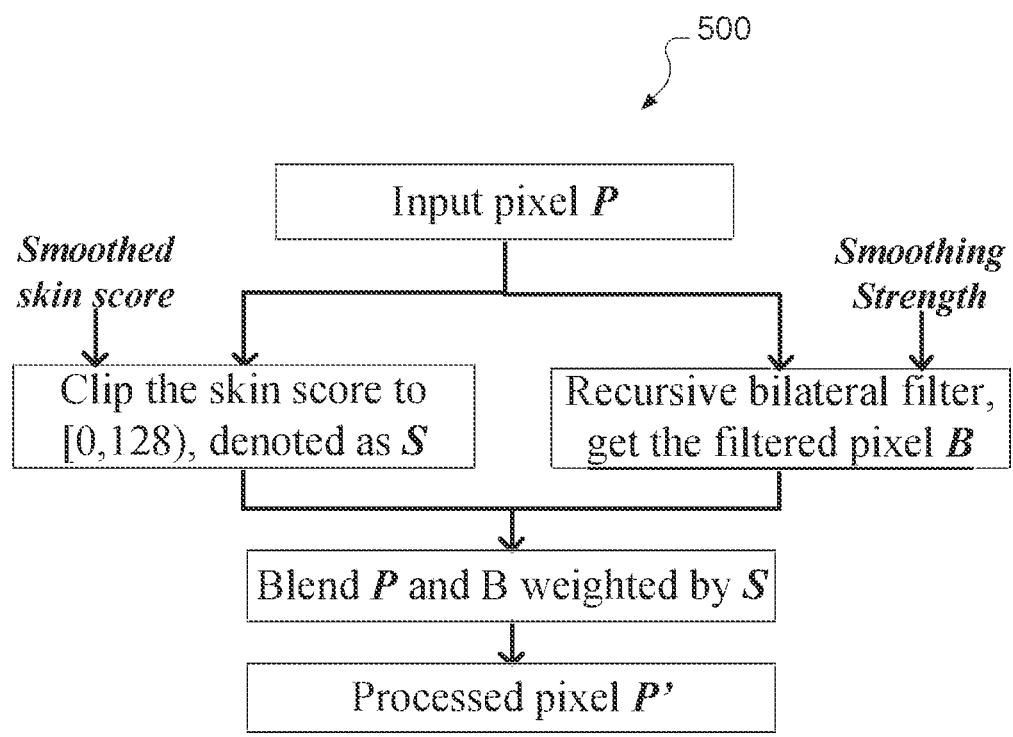
FIG. 5 is an illustrative diagram of an example skin smooth filter flow chart.

FIG. 5 illustrates an example skin smooth filter flow chart 500. In the illustrated example, skin smooth filter 500 may take YUV input data and adjust all 3-channel information to produce a smooth version of the input.

Figure 6:
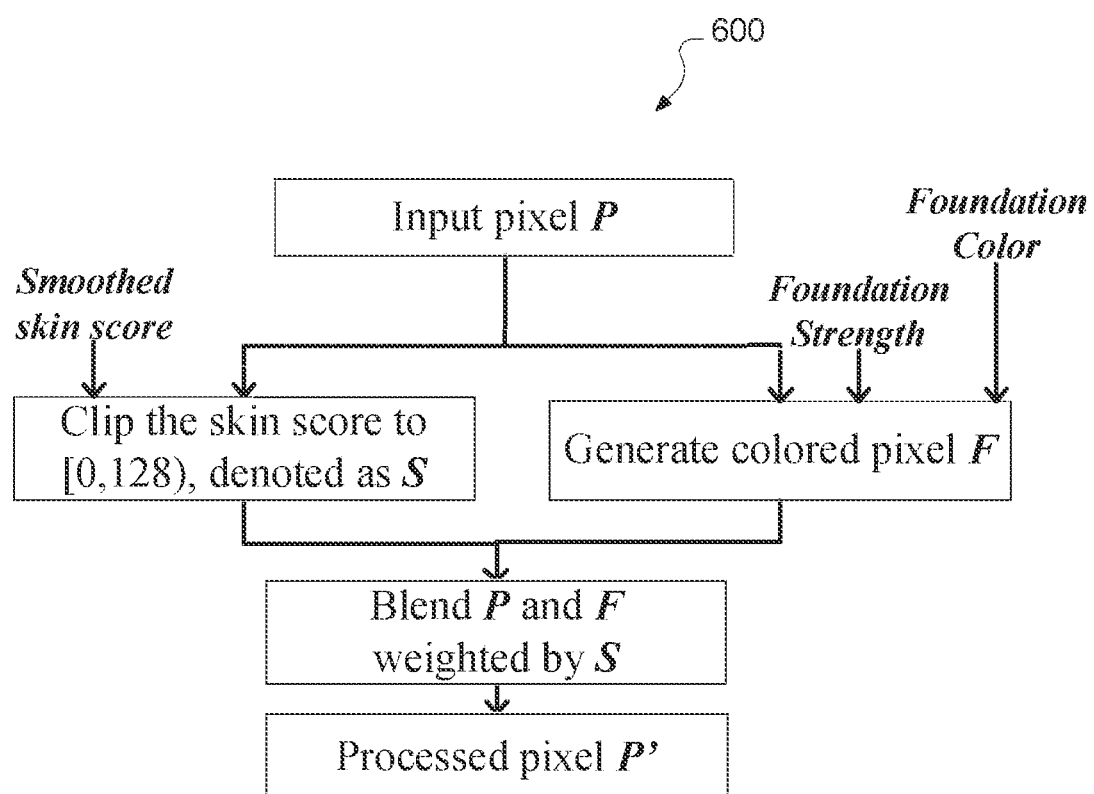
FIG. 6 is an illustrative diagram of an example foundation color flow chart.

FIG. 6 illustrates an example foundation color filter flow chart 600. In the illustrated example, foundation color filter 600 may take YUV input data and blend the input with a user-selected foundation color where the per-pixel skin-tone likelihood score serves as the blending factor here.

Figure 7:
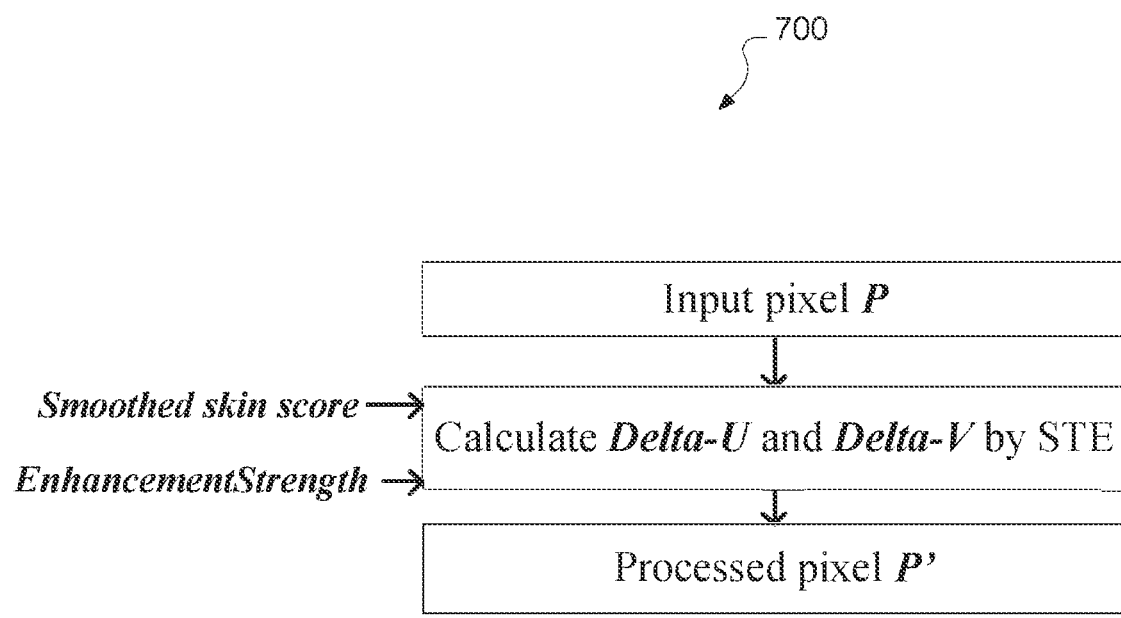
FIG. 7 is an illustrative diagram of an example skin tone enhancement flow chart.

FIG. 7 illustrates an example skin tone enhancement filter flow chart 700. In the illustrated example, skin tone enhancement filter 700 may utilize Skin-Tone Detection (STD) 102 (See FIG. 1) to perform the saturation enhancement on the skin-tone-color pixels where the enhancement is adaptive to the skin-tone likelihood score. In the illustrated example, Delta-U and Delta-V is the delta of chroma components from Skin-Tone Detection (STD) 102 (See FIG. 1).

Figure 8:
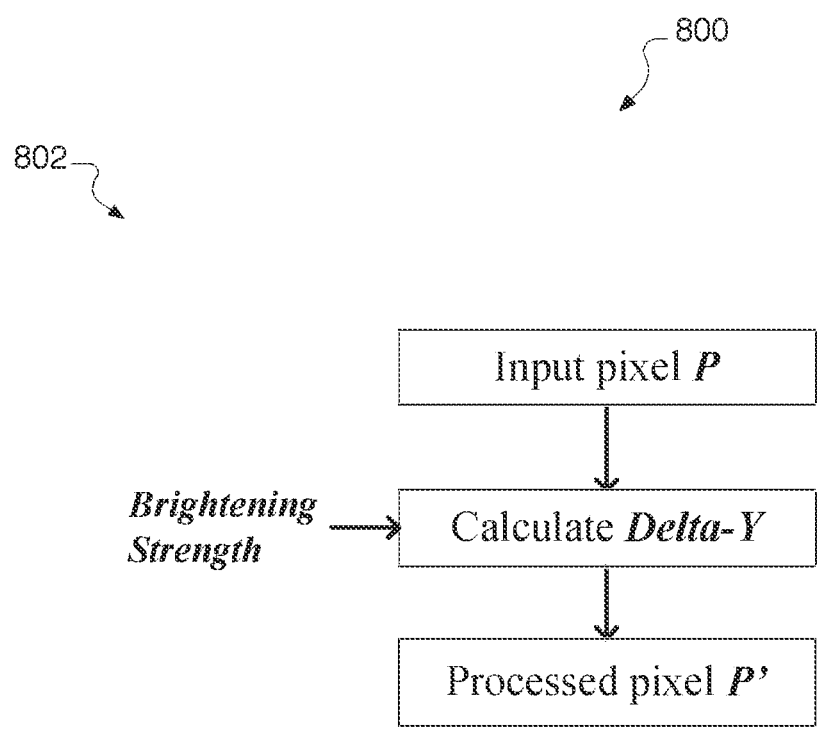
FIG. 8 is an illustrative diagram of an example face brightening flow chart.

FIG. 8 illustrates an example face brightening filter flow chart 800. In the illustrated example, face brightening filter 800 may take YUV input data and perform adjustment on Y data based on the skin-tone likelihood/score information fed from the analytic module Skin-Tone Detection (STD) 102 to produce brightening effect of the input frame. In the illustrated example, Delta-Y is the delta of luma component.

Figure 9:
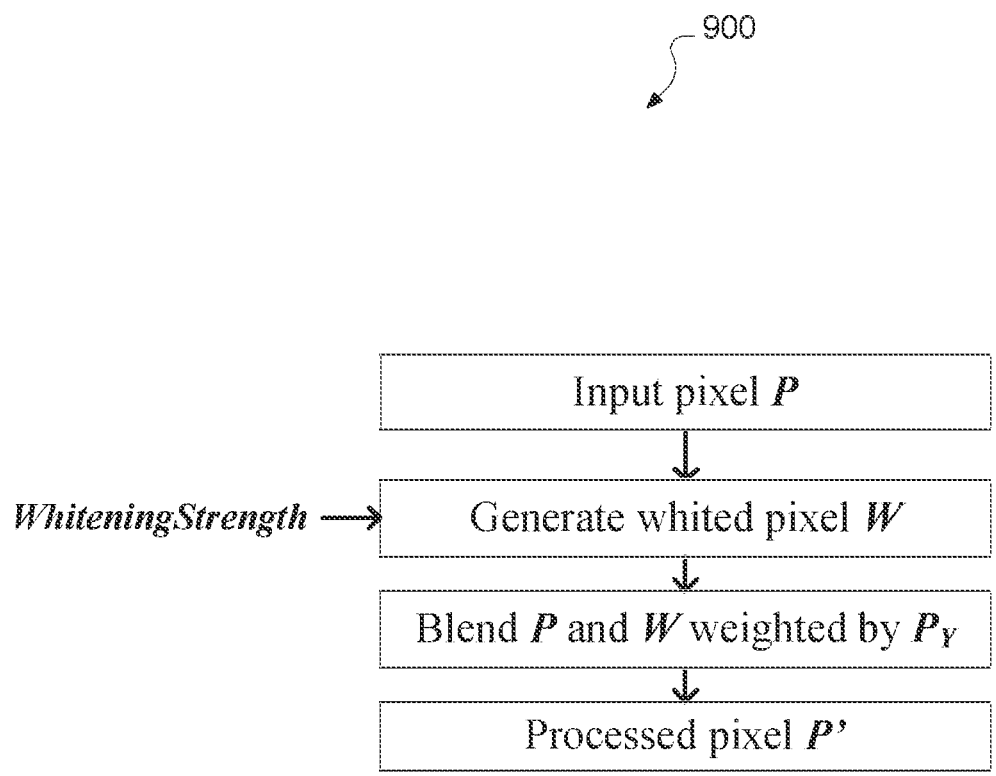
FIG. 9 is an illustrative diagram of an example face whitening flow chart.

FIG. 9 illustrates an example face whitening filter flow chart 900. In the illustrated example, face whitening filter 900 may take YUV input data and blend the input with a white color map. The white color map is input content-adaptive and is generated within the Face Whitening 112 module. The blending of the input pixels and the white color map is per-pixel wise, adaptive to the Y value of each pixel. In the illustrated example, Py is the luma component.

Figure 10:
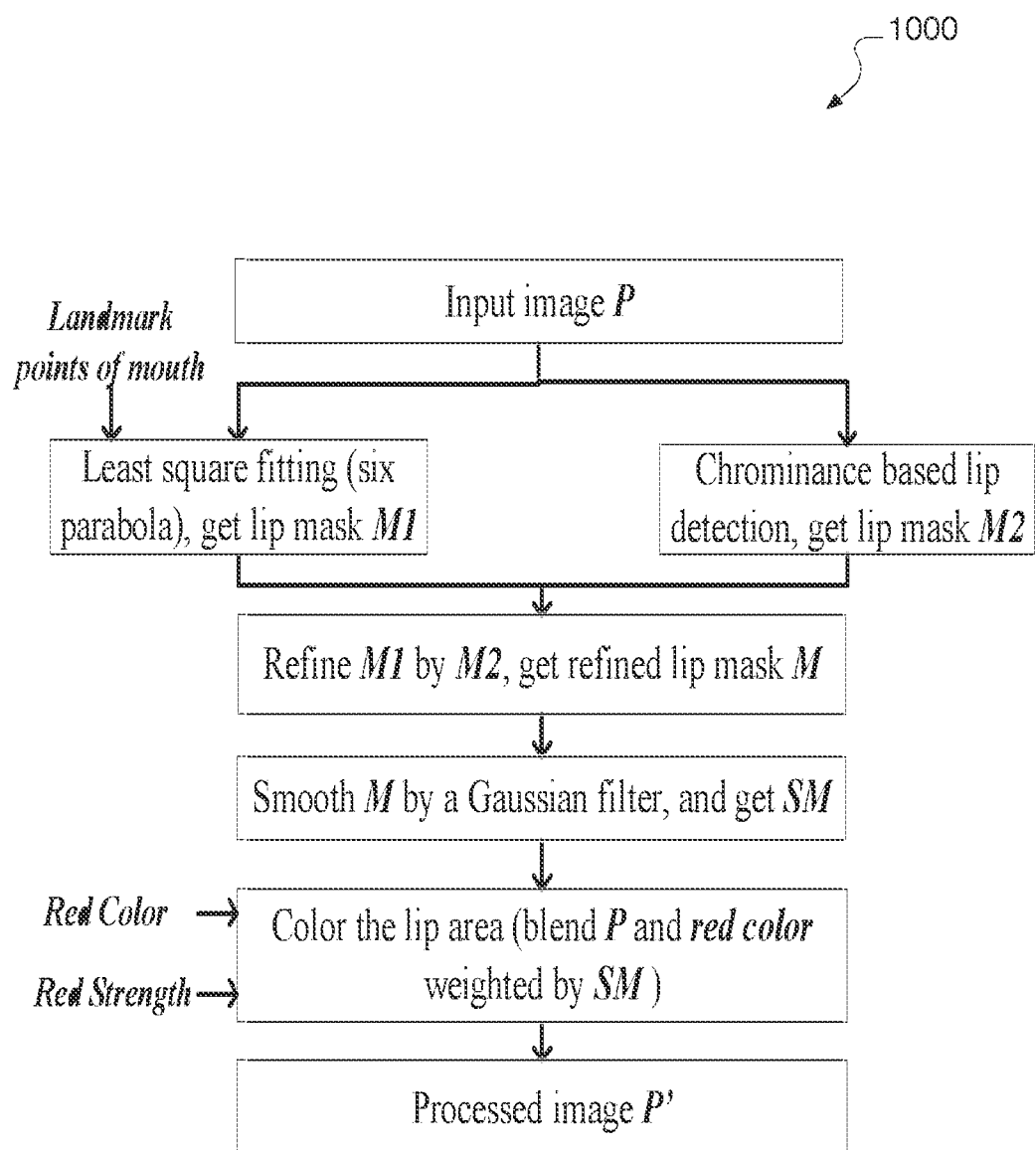
FIG. 10 is an illustrative diagram of an example red lip filter flow chart.
Figure 12:
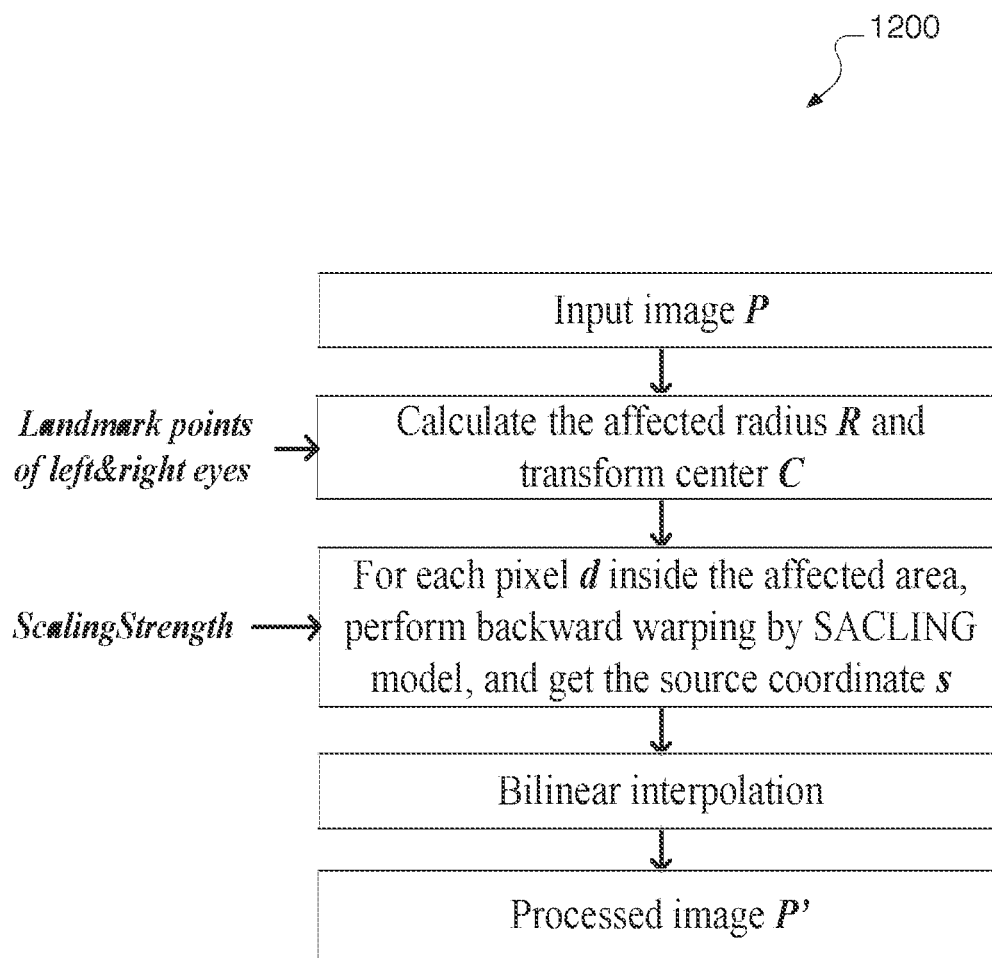
FIG. 12 is an illustrative diagram of an example big eyes filter flow chart.
Figure 13:
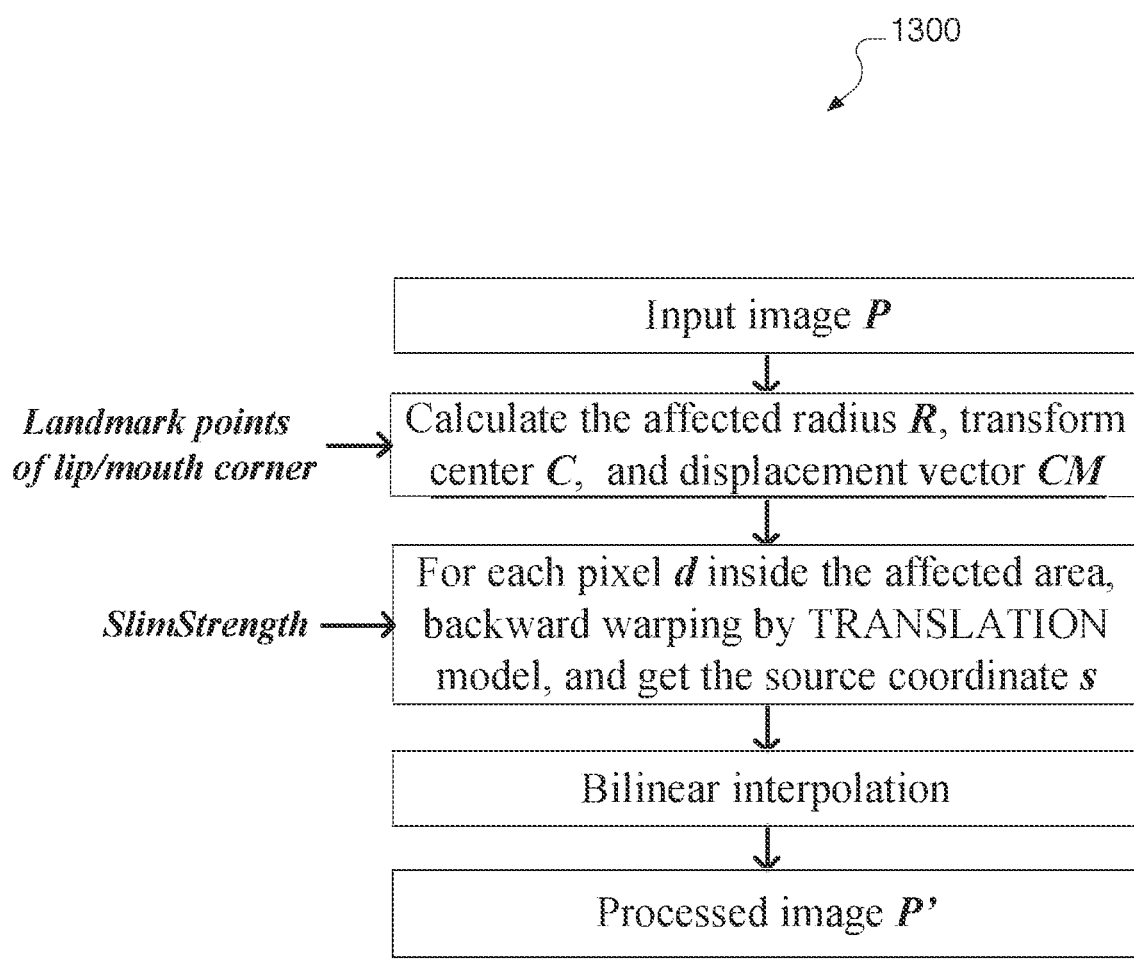
FIG. 13 is an illustrative diagram of an example slim face filter flow chart.

FIGS. 10, 12, and 13, described in greater detail below, may apply facial landmark based filters. The landmark based filters may include red lip, big eyes, slim face, the like, and/or combinations thereof.

FIG. 10 is an illustrative diagram of an example red lip filter flow chart 1000. In the illustrated example, red lip filter 1000 may take YUV input data. With the facial landmark information fed into the red lip filter 1000, the red lip filter 1000 may identify the lip area of the face if there is a face within the input frame. For input frame with detected faces, red lip filter 1000 may further perform color modification for lip area so that a visually pleasant appearance of the users' lips can be obtained.

Figure 11:
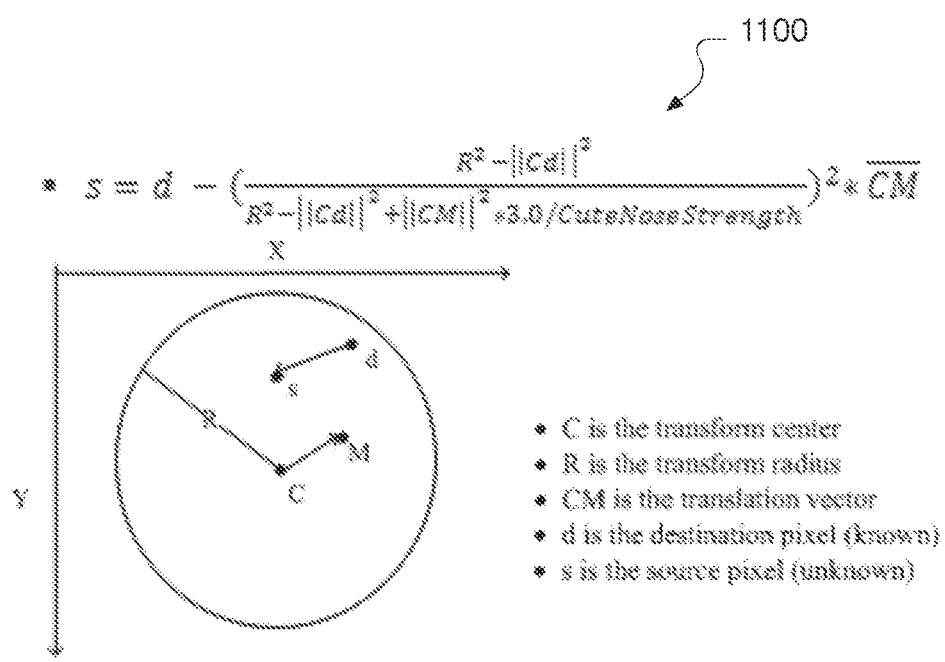
FIG. 11 is an illustrative diagram of example parameters used in warping.

FIG. 11 is an illustrative diagram of example parameters 1100 used in warping. In the illustrated example, parameters 1100 may include transform radius, transform center, translation vector, destination pixel, and source pixel (e.g., C, R, CM, d and s, respectively) for use in warping. Parameters 1100 may be associated with a formula 1102 for generating the warping map (e.g., correspondence between coordinates in the source image and those in the result image).

FIG. 12 is an illustrative diagram of an example big eyes filter flow chart 1200. In the illustrated example, big eyes filter 1200 may utilize the parameters R, C, d and s described above in FIG. 11. In the illustrated example, big eyes filter 1200 may take YUV input data. With the facial landmark information fed into the big eyes filter 1200 and the users' preference of level of enlargement input from the Application, big eyes filter 1200 may internally derive the proper location within the face and the shape of the eyes users intend to have. Morphological warping may be performed following to create the big eyes effect.

FIG. 13 is an illustrative diagram of an example slim face filter flow chart 1300. In the illustrated example, slim face filter 1300 may utilize the parameters R, C, CM, d and s described above in FIG. 11. In the illustrated example, slim face filter 1300 take YUV input data. With the facial landmark information fed into the slim face filter 1300 and the users' preference of level of slim-face-effect input from the Application, the slim face filter 1300 may internally derive the thinner-shape of the original face area and perform morphological warping to create the slim face effect.

Figure 14:
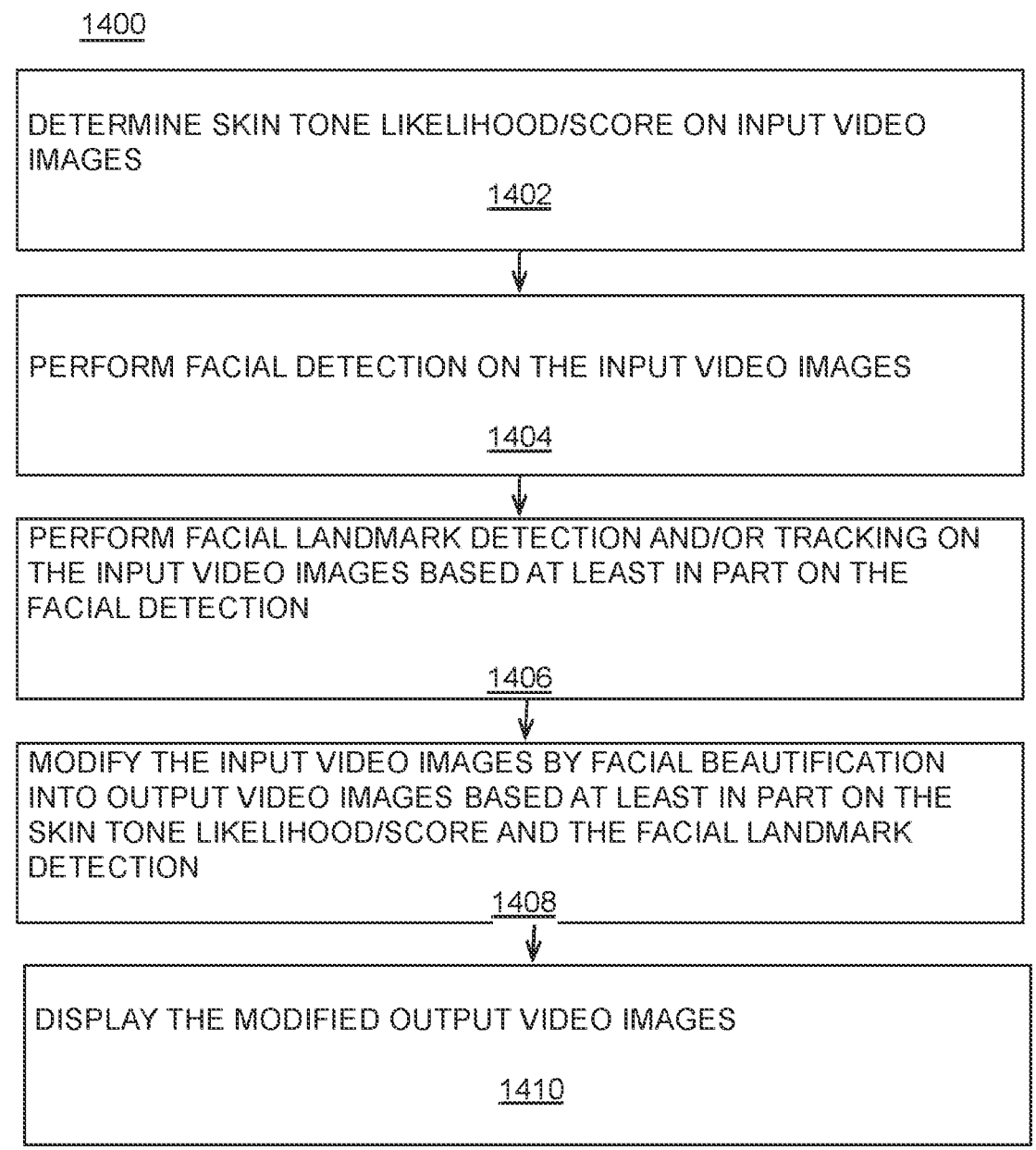
FIG. 14 provides an illustrative diagram of an example face beautification process.

FIG. 14 provides an illustrative diagram of an example face beautification process, arranged in accordance with at least some implementations of the present disclosure. In the illustrated implementation, process 1400 may include one or more operations, functions or actions as illustrated by one or more of blocks 1402, etc. By way of non-limiting example, process 1400 will be described herein with reference to example video augmentation pipe 100 of FIG. 1.

Process 1400 may be utilized as a computer-implemented method for video coding. Process 1800 may begin at block 1402, "DETERMINE SKIN TONE LIKELIHOOD/SCORE ON INPUT VIDEO IMAGES", where a skin tone likelihood/score may be determined. For example, skin tone likelihood/score may be determined via a skin tone logic unit.

Processing may continue from operation 1402 to operation 1404, "PERFORM FACIAL DETECTION ON THE INPUT VIDEO IMAGES", where facial detection may be performed. For example, facial detection may be performed via a facial feature logic unit.

Processing may continue from operation 1404 to operation 1406, "PERFORM FACIAL LANDMARK DETECTION AND/OR TRACKING ON THE INPUT VIDEO IMAGES BASED AT LEAST IN PART ON THE FACIAL DETECTION", where facial landmark detection and/or tracking may be performed. For example, facial landmark detection and/or tracking may be performed based at least in part on the facial detection via the facial feature logic unit.

In some implementations, facial landmark detection may be launched to detect the facial landmark points whenever there is a newly detected face appears in the video. For already detected faces, facial landmark tracking may be applied to update the facial landmark locations from previous frame to the current frame.

Processing may continue from operation 1404 to operation 1406, "MODIFY THE INPUT VIDEO IMAGES BY FACIAL BEAUTIFICATION INTO OUTPUT VIDEO IMAGES", where facial beautification may be performed. For example, facial beautification may be performed based at least in part on the skin tone likelihood/score and the facial landmark detection via a beautification module.

Processing may continue from operation 1406 to operation 1408, "DISPLAY THE MODIFIED OUTPUT VIDEO IMAGES", where the modified output video images may be displayed. For example, the modified output video images may be displayed via a display of some sort.

Some additional and/or alternative details related to process 1400 may be illustrated in one or more examples of implementations discussed in greater detail below with regard to FIG. 15.

Figure 15:
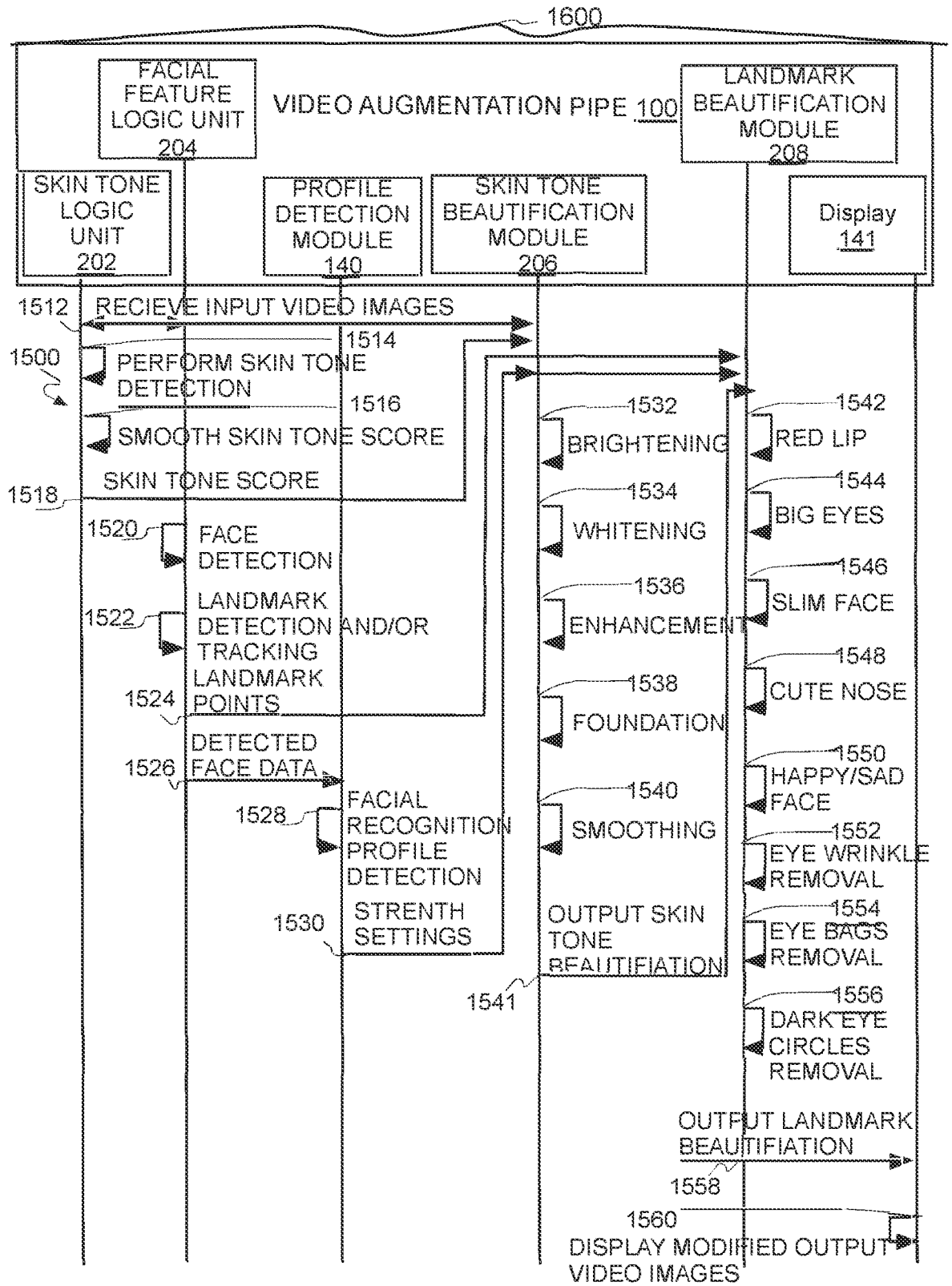
FIG. 15 provides an illustrative diagram of an example video augmentation pipe and face beautification process in operation.

FIG. 15 provides an illustrative diagram of an example video augmentation system 1600 (see, e.g., FIG. 16 for more details) and face beautification process 1500 in operation, arranged in accordance with at least some implementations of the present disclosure. Process 1500 may include one or more operations, functions or actions as illustrated by one or more of operations 1510, etc.

By way of non-limiting example, process 1500 will be described herein with reference to example video augmentation system 1600 including video augmentation system pipe 100 of FIG. 1, as is discussed further herein below with respect to FIG. 16.

Process 1500 may begin at operation 1512, "RECEIVE INPUT VIDEO IMAGES", where input video images may be received. For example, input video images may be received via the skin tone logic unit 202, the facial feature logic unit 204, and/or the beautification module 206/208.

Process 1500 may continue at operation 1514, "PERFORM SKIN TONE DETECTION", where a skin tone likelihood score may be determined. For example, skin tone likelihood score may be determined from the input video images via skin tone logic unit 202.

Process 1500 may continue at operation 1516, "SMOOTH SKIN TONE SCORE", where the skin tone likelihood score may be smoothed. For example, the skin tone likelihood score may be smoothed via the skin tone logic unit 202.

In some implementations, skin tone likelihood score 1518 from skin tone logic unit 202 may be output to skin tone beatification module 206.

Process 1500 may continue at operation 1520, "FACE DETECTION", where facial detection may be performed. For example, facial detection may be performed on the input video images via the facial feature logic unit 204.

Process 1500 may continue at operation 1522, "LANDMARK DETECTION AND/OR TRACKING", where facial landmark detection and/or tracking may be performed. For example, facial landmark detection and/or tracking may be performed on the input video images based at least in part on the facial detection via the facial feature logic unit 204.

In some implementations, landmark point data 1524 from facial feature logic unit 204 may be output to landmark beatification module 208.

In some implementations, detected face data 1526 from facial feature logic unit 204 may be output to profile detection module 140.

Process 1500 may continue at operation 1528, "FACIAL RECOGNITION PROFILE DETECTION", where facial recognition profile detection may be performed. For example, facial recognition profile detection may be performed via profile detection module 140 based at least in part on the face detection.

In some implementations, strength settings 1530 from profile detection module 140 may be output to skin tone beatification module 206 and or to landmark beatification module 208.

For example, profile detection module 140 may modify strength settings associated with various facial beatification operations based at least in part on the face detection. For example, profile detection module 140 may modify the strength settings based at least in part on one or more of the following detected facial attributes: gender, age, and race.

Alternatively, in some implementations, strength settings 1530 may instead be preset and/or be specified by a user's preference and may be output to skin tone beatification module 206 and or to landmark beatification module 208.

Process 1500 may continue at operation 1532, "BRIGHTENING"; operation 1534, "WHITENING"; operation 1536, "ENHANCEMENT"; operation 1538, "FOUNDATION"; and operation 1540, "SMOOTHING".

As will be described below (at one or more of operations 1532, 1534, 1536, 1538, 1540, 1542, 1544, 1546, 1548, 1550, 1552, 1554, and 1556) beautification module 206/208 may modify the input video images by facial beatification into output video images based at least in part on the skin tone likelihood score and/or the facial landmark detection.

For example, one or more of the following skin tone beautification operations (face brightening, face whitening, skin tone enhancement, skin foundation, and skin smoothing) may be performed via skin tone beatification portion 206 of the beautification module 204/206 based at least in part on the strength settings.

Similarly, and performing one or more of the following skin tone beautification operations (skin tone enhancement, skin foundation, and skin smoothing) may be performed via skin tone beatification portion 206 of the beautification module 204/206 based at least in part on the skin tone likelihood score.

In some implementations, operations 1532, 1534, 1536, 1538, and 1540 may be done sequentially, so that the output of one operation (e.g., operation 1532) may be used as the input video image to start the next operation (e.g., operation 1534). The above examples may include specific combination of features. However, such the above examples are not limited in this regard and, in various implementations, the above examples may include the undertaking only a subset of such features, undertaking a different order of such features, undertaking a different combination of such features, and/or undertaking additional features than those features explicitly listed.

In some implementations, output video images 1541 modified by skin tone beautification may be output to landmark beatification module 208.

Process 1500 may continue at operation 1542, "RED LIP"; operation 1544, "BIG EYES"; operation 1546, "SLIM FACE"; operation 1548, "CUTE NOSE"; operation 1550, "HAPPY/SAD FACE"; operation 1552, "EYE WRINKLE REMOVAL"; operation 1554, "EYE BAGS REMOVAL"; and operation 1556, "DARK EYE CIRCLES REMOVAL".

For example, one or more of the following landmark beautification operations (red lip alteration, big eye alteration, slim face alteration, cute/big nose alteration, happy/sad face alteration, eye wrinkle removal, eye bags removal, and dark eye circles removal) may be performed via a landmark beautification portion 208 of the beautification module 206/208 based at least in part on the strength settings and the landmark points.

In some implementations, operations 1542, 1544, 1546, 1548, 1550, 1552, 1554, and 1556 may be done sequentially, so that the output of one operation (e.g., operation 1552) may be used as the input video image to start the next operation (e.g., operation 1554). The above examples may include specific combination of features. However, such the above examples are not limited in this regard and, in various implementations, the above examples may include the undertaking only a subset of such features, undertaking a different order of such features, undertaking a different combination of such features, and/or undertaking additional features than those features explicitly listed.

In some implementations, output video images 1558 modified by landmark beautification may be output to display 141.

Alternatively, in server-type implementations, such output video images 1558 modified by landmark beautification may be output for transmission to one or more remote devices (not illustrated here).

Process 1500 may continue at operation 1560, "DISPLAY MODIFIED OUTPUT VIDEO IMAGES", where the modified output video images may be displayed. For example, the modified output video images as modified by the beautification module 206/208 may be displayed via display 141.

In some implementations, video augmentation pipe 100 may be implemented on a mobile platform type GPU.

Alternatively, in some implementations, video augmentation pipe 100 may be implemented on a server platform type GPU. In such an implementation, the server platform type GPU may include several virtual GPUs that may share one physical GPU. The server platform type GPU may be configured to transfer input video images as well as output video images modified by the facial beatification operations between one or more remote devices (not shown) in communication with sever platform GPU.

Some additional and/or alternative details related to process 1500 and other processes discussed herein may be illustrated in one or more examples of implementations discussed herein and, in particular, with respect to FIG. 16 below.

Various components of the systems and/or processes described herein may be implemented in software, firmware, and/or hardware and/or any combination thereof. For example, various components of the systems and/or processes described herein may be provided, at least in part, by hardware of a computing System-on-a-Chip (SoC) such as may be found in a computing system such as, for example, a smart phone. Those skilled in the art may recognize that systems described herein may include additional components that have not been depicted in the corresponding figures.

As used in any implementation described herein, the term "module" may refer to a "component" or to a "logic unit", as these terms are described below. Accordingly, the term "module" may refer to any combination of software logic, firmware logic, and/or hardware logic configured to provide the functionality described herein. For example, one of ordinary skill in the art will appreciate that operations performed by hardware and/or firmware may alternatively be implemented via a software component, which may be embodied as a software package, code and/or instruction set, and also appreciate that a logic unit may also utilize a portion of software to implement its functionality.

As used in any implementation described herein, the term "component" refers to any combination of software logic and/or firmware logic configured to provide the functionality described herein. The software logic may be embodied as a software package, code and/or instruction set, and/or firmware that stores instructions executed by programmable circuitry. The components may, collectively or individually, be embodied for implementation as part of a larger system, for example, an integrated circuit (IC), system on-chip (SoC), and so forth.

As used in any implementation described herein, the term "logic unit" refers to any combination of firmware logic and/or hardware logic configured to provide the functionality described herein. The "hardware", as used in any implementation described herein, may include, for example, singly or in any combination, hardwired circuitry, programmable circuitry, state machine circuitry, and/or firmware that stores instructions executed by programmable circuitry. The logic units may, collectively or individually, be embodied as circuitry that forms part of a larger system, for example, an integrated circuit (IC), system on-chip (SoC), and so forth. For example, a logic unit may be embodied in logic circuitry for the implementation firmware or hardware of the systems discussed herein. Further, one of ordinary skill in the art will appreciate that operations performed by hardware and/or firmware may also utilize a portion of software to implement the functionality of the logic unit.

In addition, any one or more of the blocks of the processes described herein may be undertaken in response to instructions provided by one or more computer program products. Such program products may include signal bearing media providing instructions that, when executed by, for example, a processor, may provide the functionality described herein. The computer program products may be provided in any form of computer readable medium. Thus, for example, a processor including one or more processor core(s) may undertake one or more operations in response to instructions conveyed to the processor by a computer readable medium.

Figure 16:
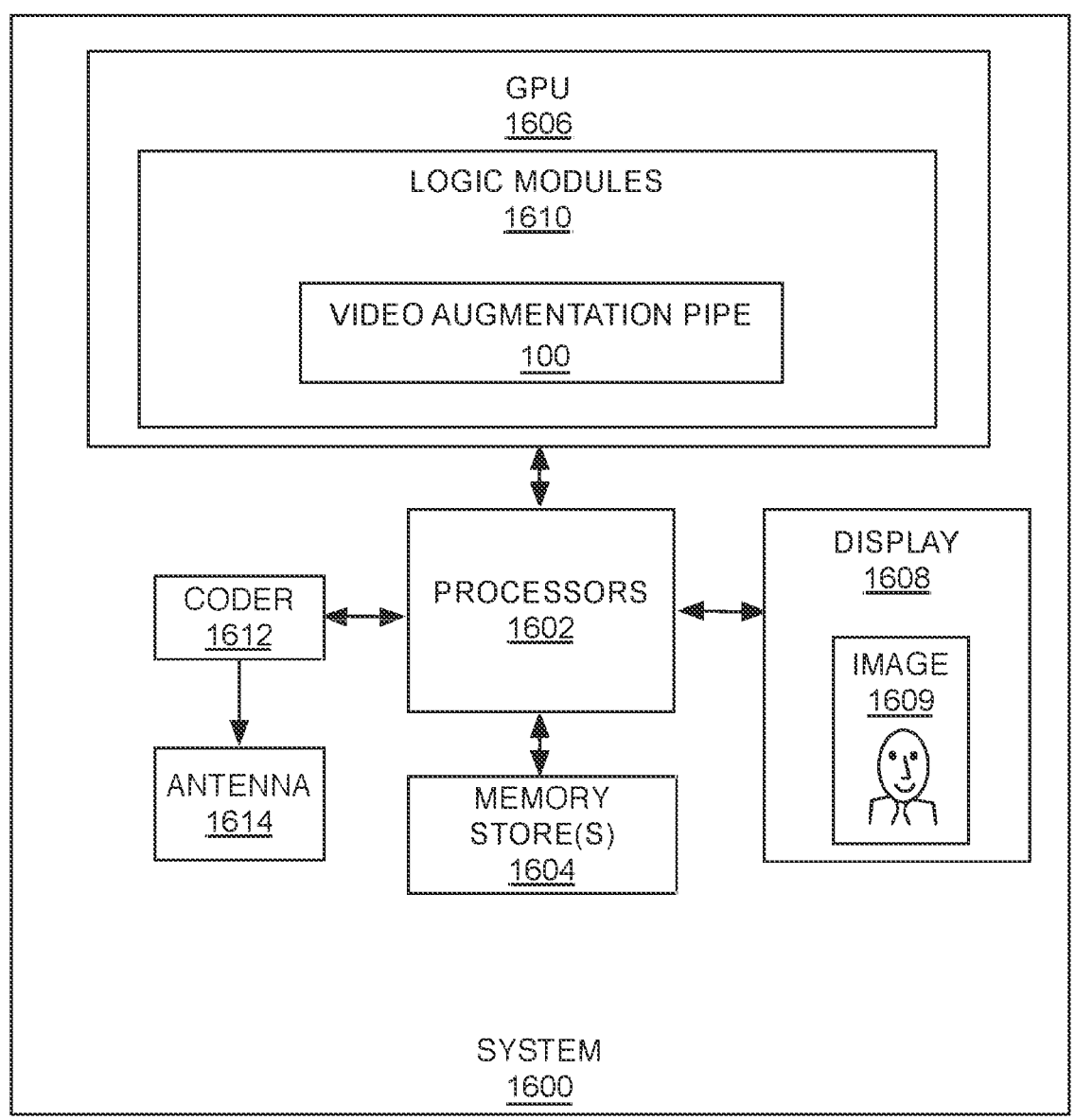
FIG. 16 is an illustrative diagram of an example video coding system.

FIG. 16 is an illustrative diagram of an example graphics processing system 1600, arranged in accordance with at least some implementations of the present disclosure. In the illustrated implementation, graphics processing system 1600 may include one or more processors 1602, one or more memory stores 1604, GPUs 1606, display 1608 to provide images 1609, logic modules 1610, coder 1612, and/or antenna 1614.

As illustrated, processors 1602, memory store 1604, GPU 1606, display 1608, coder 1612, and/or antenna 1614 may be capable of communication with one another and/or communication with portions of logic modules 1610.

In some implementations, graphics processing system 1600 may include antenna 1612. For example, antenna 1612 may be configured to transmit or receive an encoded bitstream of video data, for example. Processor(s) 1602 and/or GPU(s) 1006 may be any type of processor and/or processing unit. For example, processor(s) 1602 may include distinct central processing units, distinct graphic processing units, integrated system-on-a-chip (SoC) architectures, the like, and/or combinations thereof. In addition, memory store(s) 1608 may be any type of memory. For example, memory store(s) 1604 may be volatile memory (e.g., Static Random Access Memory (SRAM), Dynamic Random Access Memory (DRAM), etc.) or non-volatile memory (e.g., flash memory, etc.), and so forth. In a non-limiting example, memory store(s) 1604 may be implemented by cache memory. Further, in some implementations, graphics processing system 1600 may include display device 168. Display device 1608 may be configured to present video data as images 1609.

In some implementations, logic modules 1610 may embody various modules as discussed with respect to any system or subsystem described herein. In various embodiments, some of logic modules 1610 may be implemented in hardware, while software may implement other logic modules. For example, in some embodiments, some of logic modules 1610 may be implemented by application-specific integrated circuit (ASIC) logic while other logic modules may be provided by software instructions executed by logic such as GPU 1606, for example. However, the present disclosure is not limited in this regard and some of logic modules 1610 may be implemented by any combination of hardware, firmware and/or software.

For example, logic modules 1610 may include a video augmentation pipe 100, and/or the like configured to implement operations of one or more of the implementations described herein.

Figure 17:
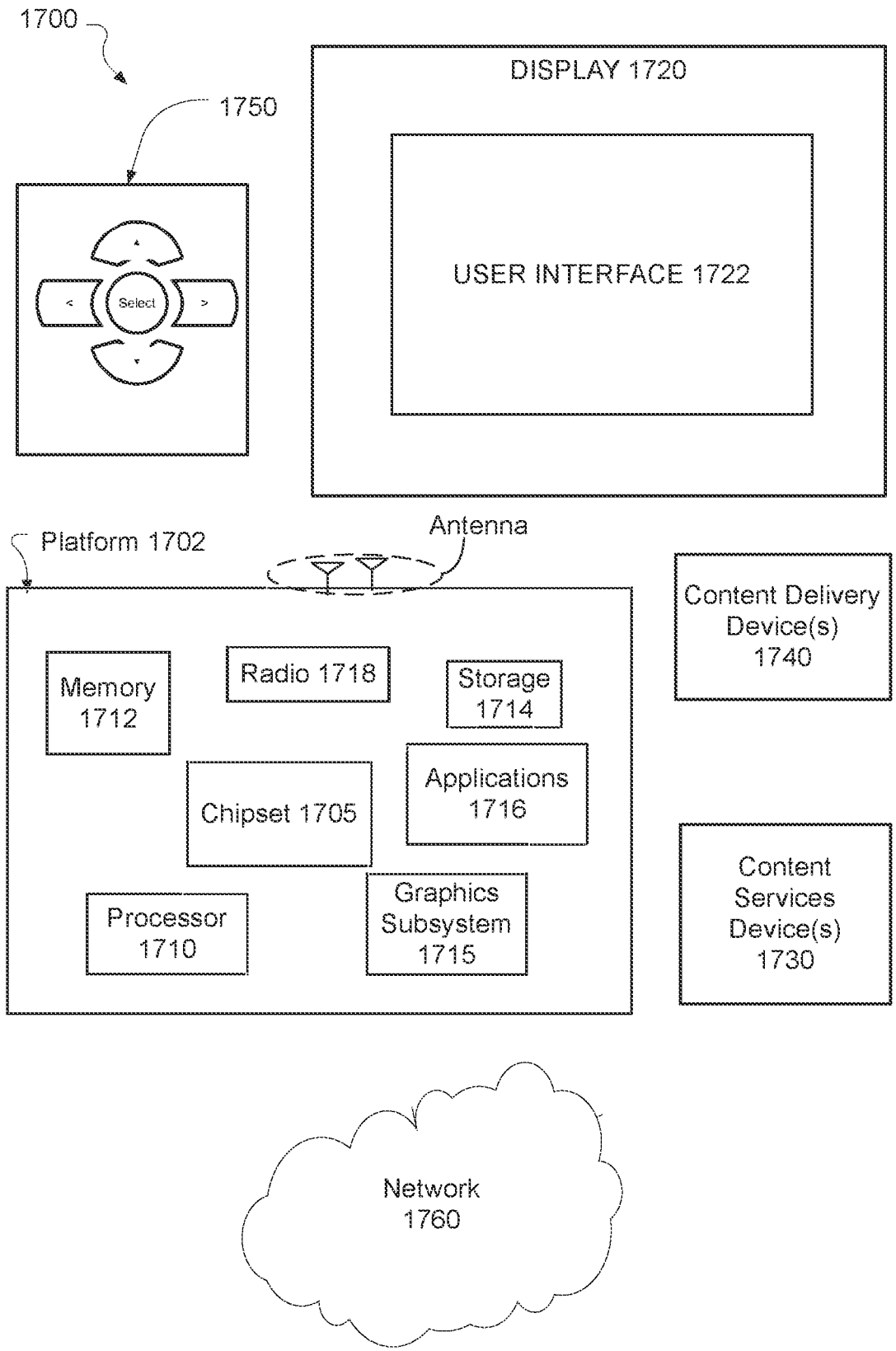
FIG. 17 is an illustrative diagram of an example system.

FIG. 17 is an illustrative diagram of an example system 1700, arranged in accordance with at least some implementations of the present disclosure. In various implementations, system 1700 may be a media system although system 1700 is not limited to this context. For example, system 1700 may be incorporated into a personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, cameras (e.g. point-and-shoot cameras, super-zoom cameras, digital single-lens reflex (DSLR) cameras), and so forth.

In various implementations, system 1700 includes a platform 1702 coupled to a display 1720. Platform 1702 may receive content from a content device such as content services device(s) 1730 or content delivery device(s) 1740 or other similar content sources. A navigation controller 1750 including one or more navigation features may be used to interact with, for example, platform 1702 and/or display 1720. Each of these components is described in greater detail below.

In various implementations, platform 1702 may include any combination of a chipset 1705, processor 1710, memory 1712, antenna 1713, storage 1714, graphics subsystem 1715, applications 1716 and/or radio 1718. Chipset 1705 may provide intercommunication among processor 1710, memory 1712, storage 1714, graphics subsystem 1715, applications 1716 and/or radio 1718. For example, chipset 1705 may include a storage adapter (not depicted) capable of providing intercommunication with storage 1714.

Processor 1710 may be implemented as a Complex Instruction Set Computer (CISC) or Reduced Instruction Set Computer (RISC) processors, x86 instruction set compatible processors, multi-core, or any other microprocessor or central processing unit (CPU). In various implementations, processor 1710 may be dual-core processor(s), dual-core mobile processor(s), and so forth.

Memory 1712 may be implemented as a volatile memory device such as, but not limited to, a Random Access Memory (RAM), Dynamic Random Access Memory (DRAM), or Static RAM (SRAM).

Storage 1714 may be implemented as a non-volatile storage device such as, but not limited to, a magnetic disk drive, optical disk drive, tape drive, an internal storage device, an attached storage device, flash memory, battery backed-up SDRAM (synchronous DRAM), and/or a network accessible storage device. In various implementations, storage 1714 may include technology to increase the storage performance enhanced protection for valuable digital media when multiple hard drives are included, for example.

Graphics subsystem 1715 may perform processing of images such as still or video for display. Graphics subsystem 1715 may be a graphics processing unit (GPU) or a visual processing unit (VPU), for example. An analog or digital interface may be used to communicatively couple graphics subsystem 1715 and display 1720. For example, the interface may be any of a High-Definition Multimedia Interface, DisplayPort, wireless HDMI, and/or wireless HD compliant techniques. Graphics subsystem 1715 may be integrated into processor 1710 or chipset 1705. In some implementations, graphics subsystem 1715 may be a stand-alone device communicatively coupled to chipset 1705.

The graphics and/or video processing techniques described herein may be implemented in various hardware architectures. For example, graphics and/or video functionality may be integrated within a chipset. Alternatively, a discrete graphics and/or video processor may be used. As still another implementation, the graphics and/or video functions may be provided by a general purpose processor, including a multi-core processor. In further embodiments, the functions may be implemented in a consumer electronics device.

Radio 1718 may include one or more radios capable of transmitting and receiving signals using various suitable wireless communications techniques. Such techniques may involve communications across one or more wireless networks. Example wireless networks include (but are not limited to) wireless local area networks (WLANs), wireless personal area networks (WPANs), wireless metropolitan area network (WMANs), cellular networks, and satellite networks. In communicating across such networks, radio 1718 may operate in accordance with one or more applicable standards in any version.

In various implementations, display 1720 may include any television type monitor or display. Display 1720 may include, for example, a computer display screen, touch screen display, video monitor, television-like device, and/or a television. Display 1720 may be digital and/or analog. In various implementations, display 1720 may be a holographic display. Also, display 1720 may be a transparent surface that may receive a visual projection. Such projections may convey various forms of information, images, and/or objects. For example, such projections may be a visual overlay for a mobile augmented reality (MAR) application. Under the control of one or more software applications 1716, platform 1702 may display user interface 1722 on display 1720.

In various implementations, content services device(s) 1730 may be hosted by any national, international and/or independent service and thus accessible to platform 1702 via the Internet, for example. Content services device(s) 1730 may be coupled to platform 1702 and/or to display 1720. Platform 1702 and/or content services device(s) 1730 may be coupled to a network 1760 to communicate (e.g., send and/or receive) media information to and from network 1760. Content delivery device(s) 1740 also may be coupled to platform 1702 and/or to display 1720.

In various implementations, content services device(s) 1730 may include a cable television box, personal computer, network, telephone, Internet enabled devices or appliance capable of delivering digital information and/or content, and any other similar device capable of unidirectionally or bidirectionally communicating content between content providers and platform 1702 and/display 1720, via network 1760 or directly. It will be appreciated that the content may be communicated unidirectionally and/or bidirectionally to and from any one of the components in system 1700 and a content provider via network 1760. Examples of content may include any media information including, for example, video, music, medical and gaming information, and so forth.

Content services device(s) 1730 may receive content such as cable television programming including media information, digital information, and/or other content. Examples of content providers may include any cable or satellite television or radio or Internet content providers. The provided examples are not meant to limit implementations in accordance with the present disclosure in any way.

In various implementations, platform 1702 may receive control signals from navigation controller 1750 having one or more navigation features. The navigation features of controller 1750 may be used to interact with user interface 1722, for example. In various embodiments, navigation controller 1750 may be a pointing device that may be a computer hardware component (specifically, a human interface device) that allows a user to input spatial (e.g., continuous and multi-dimensional) data into a computer. Many systems such as graphical user interfaces (GUI), and televisions and monitors allow the user to control and provide data to the computer or television using physical gestures.

Movements of the navigation features of controller 1750 may be replicated on a display (e.g., display 1720) by movements of a pointer, cursor, focus ring, or other visual indicators displayed on the display. For example, under the control of software applications 1716, the navigation features located on navigation controller 1750 may be mapped to virtual navigation features displayed on user interface 1722. In various embodiments, controller 1750 may not be a separate component but may be integrated into platform 1702 and/or display 1720. The present disclosure, however, is not limited to the elements or in the context shown or described herein.

In various implementations, drivers (not shown) may include technology to enable users to instantly turn on and off platform 1702 like a television with the touch of a button after initial boot-up, when enabled, for example. Program logic may allow platform 1702 to stream content to media adaptors or other content services device(s) 1730 or content delivery device(s) 1740 even when the platform is turned "off." In addition, chipset 1705 may include hardware and/or software support for (5.1) surround sound audio and/or high definition (7.1) surround sound audio, for example. Drivers may include a graphics driver for integrated graphics platforms. In various embodiments, the graphics driver may comprise a peripheral component interconnect (PCI) Express graphics card.

In various implementations, any one or more of the components shown in system 1700 may be integrated. For example, platform 1702 and content services device(s) 1730 may be integrated, or platform 1702 and content delivery device(s) 1740 may be integrated, or platform 1702, content services device(s) 1730, and content delivery device(s) 1740 may be integrated, for example. In various embodiments, platform 1702 and display 1720 may be an integrated unit. Display 1720 and content service device(s) 1730 may be integrated, or display 1720 and content delivery device(s) 1740 may be integrated, for example. These examples are not meant to limit the present disclosure.

In various embodiments, system 1700 may be implemented as a wireless system, a wired system, or a combination of both. When implemented as a wireless system, system 1700 may include components and interfaces suitable for communicating over a wireless shared media, such as one or more antennas, transmitters, receivers, transceivers, amplifiers, filters, control logic, and so forth. An example of wireless shared media may include portions of a wireless spectrum, such as the RF spectrum and so forth. When implemented as a wired system, system 1700 may include components and interfaces suitable for communicating over wired communications media, such as input/output (I/O) adapters, physical connectors to connect the I/O adapter with a corresponding wired communications medium, a network interface card (NIC), disc controller, video controller, audio controller, and the like. Examples of wired communications media may include a wire, cable, metal leads, printed circuit board (PCB), backplane, switch fabric, semiconductor material, twisted-pair wire, co-axial cable, fiber optics, and so forth.

Platform 1702 may establish one or more logical or physical channels to communicate information. The information may include media information and control information. Media information may refer to any data representing content meant for a user. Examples of content may include, for example, data from a voice conversation, videoconference, streaming video, electronic mail ("email") message, voice mail message, alphanumeric symbols, graphics, image, video, text and so forth. Data from a voice conversation may be, for example, speech information, silence periods, background noise, comfort noise, tones and so forth. Control information may refer to any data representing commands, instructions or control words meant for an automated system. For example, control information may be used to route media information through a system, or instruct a node to process the media information in a predetermined manner. The embodiments, however, are not limited to the elements or in the context shown or described in FIG. 17.

Figure 18:
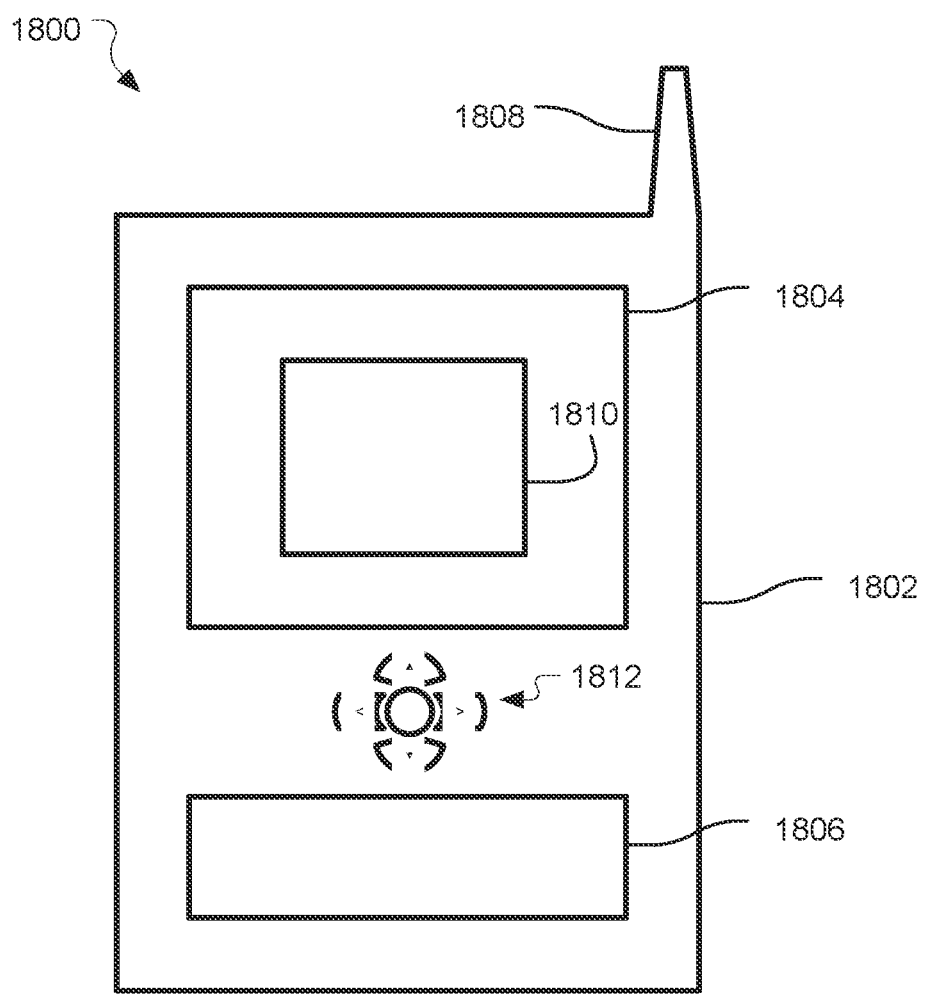
FIG. 18 is an illustrative diagram of an example system, all arranged in accordance with at least some implementations of the present disclosure.

As described above, system 1700 may be embodied in varying physical styles or form factors. FIG. 18 illustrates implementations of a small form factor device 1800 in which system 1800 may be embodied. In various embodiments, for example, device 1800 may be implemented as a mobile computing device a having wireless capabilities. A mobile computing device may refer to any device having a processing system and a mobile power source or supply, such as one or more batteries, for example.

As described above, examples of a mobile computing device may include a personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, cameras (e.g. point-and-shoot cameras, super-zoom cameras, digital single-lens reflex (DSLR) cameras), and so forth.

Examples of a mobile computing device also may include computers that are arranged to be worn by a person, such as a wrist computer, finger computer, ring computer, eyeglass computer, belt-clip computer, arm-band computer, shoe computers, clothing computers, and other wearable computers. In various embodiments, for example, a mobile computing device may be implemented as a smart phone capable of executing computer applications, as well as voice communications and/or data communications. Although some embodiments may be described with a mobile computing device implemented as a smart phone by way of example, it may be appreciated that other embodiments may be implemented using other wireless mobile computing devices as well. The embodiments are not limited in this context.

As shown in FIG. 18, device 1800 may include a housing 1802, a display 1804 which may include a user interface 1810, an input/output (I/O) device 1806, and an antenna 1808. Device 1800 also may include navigation features 1812. Display 1804 may include any suitable display unit for displaying information appropriate for a mobile computing device. I/O device 1806 may include any suitable I/O device for entering information into a mobile computing device. Examples for I/O device 1806 may include an alphanumeric keyboard, a numeric keypad, a touch pad, input keys, buttons, switches, rocker switches, microphones, speakers, voice recognition device and software, image sensors, and so forth. Information also may be entered into device 1800 by way of microphone (not shown). Such information may be digitized by a voice recognition device (not shown). The embodiments are not limited in this context.

Various embodiments may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

While certain features set forth herein have been described with reference to various implementations, this description is not intended to be construed in a limiting sense. Hence, various modifications of the implementations described herein, as well as other implementations, which are apparent to persons skilled in the art to which the present disclosure pertains are deemed to lie within the spirit and scope of the present disclosure.

The following examples pertain to further embodiments.

In one example, a computer-implemented method for video augmentation on a GPU may include determining, via a skin tone logic unit of the GPU, a skin tone likelihood score on input video images; performing, via a facial feature logic unit of the GPU, facial detection on the input video images; performing, via the facial feature logic unit, facial landmark detection and/or tracking on the input video images based at least in part on the facial detection; and modifying, via a beautification module of the GPU, the input video images by facial beautification into output video images based at least in part on the skin tone likelihood score and the facial landmark detection.

In another example, a computer-implemented method for video augmentation on a GPU may include where the GPU is a server platform type GPU, where the server platform type GPU includes several virtual GPUs that share one physical GPU, and where the server platform type GPU is configured to transfer input video images as well as output video images modified by the facial beatification operations between one or more remote devices in communication with sever platform GPU; receiving input video images via the skin tone logic unit, the facial feature logic unit, and the beautification module; smoothing, via the skin tone logic unit, the skin tone likelihood score; performing, via a profile detection module, facial recognition profile detection based at least in part on the face detection; modifying, via the profile detection module, strength settings associated with various facial beatification operations based at least in part on the face detection, where the strength settings may be based at least in part on one or more of the following detected facial attributes: gender, age, and race; performing, via a skin tone beautification portion of the beautification module, one or more of the following skin tone beautification operations based at least in part on the strength settings: face brightening, face whitening, skin tone enhancement, skin foundation, and skin smoothing, and performing one or more of the following skin tone beautification operations based at least in part on the skin tone likelihood score: skin tone enhancement, skin foundation, and skin smoothing; and performing, via a landmark beautification portion of the beautification module, one or more of the following landmark beautification operations based at least in part on the strength settings and the landmark points as well as the performed skin tone beautification operations: red lip alteration, big eye alteration, slim face alteration, cute/big nose alteration, happy/sad face alteration, eye wrinkle removal, eye bags removal, and dark eye circles removal.

In still another example, a computer-implemented method for video augmentation on a GPU may include where the GPU is a mobile platform type GPU; receiving input video images via the skin tone logic unit, the facial feature logic unit, and the beautification module; smoothing, via the skin tone logic unit, the skin tone likelihood score; performing, via a profile detection module, facial recognition profile detection based at least in part on the face detection; modifying, via the profile detection module, strength settings associated with various facial beatification operations based at least in part on the face detection, where the strength settings may be based at least in part on one or more of the following detected facial attributes: gender, age, and race; performing, via a skin tone beautification portion of the beautification module, one or more of the following skin tone beautification operations based at least in part on the strength settings: face brightening, face whitening, skin tone enhancement, skin foundation, and skin smoothing, and performing one or more of the following skin tone beautification operations based at least in part on the skin tone likelihood score: skin tone enhancement, skin foundation, and skin smoothing; performing, via a landmark beautification portion of the beautification module, one or more of the following landmark beautification operations based at least in part on the strength settings and the landmark points as well as the performed skin tone beautification operations: red lip alteration, big eye alteration, slim face alteration, cute/big nose alteration, happy/sad face alteration, eye wrinkle removal, eye bags removal, and dark eye circles removal; and displaying, via a display, output video images as modified by the beautification module.

In other examples, a system for video augmentation may include one or more graphics processing units, the one or more graphics processing units including a skin tone logic unit, a facial feature logic unit, and a beautification module; one or more memory stores communicatively coupled to the one or more graphics processing units; where the one or more graphics processing units are configured to: determine, via the skin tone logic unit, a skin tone likelihood score on input video images, perform, via the facial feature logic unit, facial detection on the input video images, perform, via the facial feature logic unit, facial landmark detection and/or tracking on the input video images based at least in part on the facial detection, and modify, via the beautification module, the input video images by facial beautification into output video images based at least in part on the skin tone likelihood score and the facial landmark detection.

In another example, the system for video augmentation may further include where the one or more graphics processing units are server platform type GPU, where the server platform type GPU includes several virtual GPUs that share one physical GPU, and where the server platform type GPU is configured to transfer input video images as well as output video images modified by the facial beatification operations between one or more remote devices in communication with sever platform GPU; where the one or more graphics processing units are configured to: receive input video images via the skin tone logic unit, the facial feature logic unit, and the beautification module; smooth, via the skin tone logic unit, the skin tone likelihood score; perform, via a profile detection module, facial recognition profile detection based at least in part on the face detection; modify, via the profile detection module, strength settings associated with various facial beatification operations based at least in part on the face detection, where the strength settings may be based at least in part on one or more of the following detected facial attributes: gender, age, and race; perform, via a skin tone beautification portion of the beautification module, one or more of the following skin tone beautification operations based at least in part on the strength settings: face brightening, face whitening, skin tone enhancement, skin foundation, and skin smoothing, and performing one or more of the following skin tone beautification operations based at least in part on the skin tone likelihood score: skin tone enhancement, skin foundation, and skin smoothing; and perform, via a landmark beautification portion of the beautification module, one or more of the following landmark beautification operations based at least in part on the strength settings and the landmark points as well as the performed skin tone beautification operations: red lip alteration, big eye alteration, slim face alteration, cute/big nose alteration, happy/sad face alteration, eye wrinkle removal, eye bags removal, and dark eye circles removal.

In further example, an apparatus for video augmentation may include a graphics processing unit (GPU), the graphics processing unit configured to: determine, via a skin tone logic unit, a skin tone likelihood score on input video images; perform, via a facial feature logic unit, facial detection on the input video images; perform, via the facial feature logic unit, facial landmark detection and/or tracking on the input video images based at least in part on the facial detection; and modify, via a beautification module, the input video images by facial beautification into output video images based at least in part on the skin tone likelihood score and the facial landmark detection.

In another example, the apparatus for video augmentation may further include where the GPU is a mobile platform type GPU; where the graphics processing unit is further configured to: receive input video images via the skin tone logic unit, the facial feature logic unit, and the beautification module; smooth, via the skin tone logic unit, the skin tone likelihood score; perform, via a profile detection module, facial recognition profile detection based at least in part on the face detection; modify, via the profile detection module, strength settings associated with various facial beatification operations based at least in part on the face detection, where the strength settings may be based at least in part on one or more of the following detected facial attributes: gender, age, and race; perform, via a skin tone beautification portion of the beautification module, one or more of the following skin tone beautification operations based at least in part on the strength settings: face brightening, face whitening, skin tone enhancement, skin foundation, and skin smoothing, and performing one or more of the following skin tone beautification operations based at least in part on the skin tone likelihood score: skin tone enhancement, skin foundation, and skin smoothing; perform, via a landmark beautification portion of the beautification module, one or more of the following landmark beautification operations based at least in part on the strength settings and the landmark points as well as the performed skin tone beautification operations: red lip alteration, big eye alteration, slim face alteration, cute/big nose alteration, happy/sad face alteration, eye wrinkle removal, eye bags removal, and dark eye circles removal; and cause to be displayed, via a display, output video images as modified by the beautification module.

In a further example, at least one machine-readable medium may include a plurality of instructions that in response to being executed on a computing device, causes the computing device to perform the method according to any one of the above examples.

In a still further example, an apparatus may include means for performing the methods according to any one of the above examples.

The above examples may include specific combination of features. However, such the above examples are not limited in this regard and, in various implementations, the above examples may include the undertaking only a subset of such features, undertaking a different order of such features, undertaking a different combination of such features, and/or undertaking additional features than those features explicitly listed. For example, all features described with respect to the example methods may be implemented with respect to the example apparatus, the example systems, and/or the example articles, and vice versa.

What is claimed is:

1. A method of video augmentation, comprising:
performing facial detection on a video to detect a face of a subject in the video;
detecting a skin tone of the subject based on the face by determining a skin tone likelihood score for each pixel of a plurality of images included in the video and performing an averaging operation on the skin tone likelihood score;
modifying the face of the subject in the video by applying beauty effects to create a modified video; and
outputting the modified video.

2. The method of claim 1, wherein the beauty effects include smoothing skin of the face of the subject in the video.

3. The method of claim 2, wherein
the averaging operation results in a smoothed skin score, applying the beauty effects to the video comprises:
modifying input pixels from the images to generate modified pixels, and
blending the input pixels with the modified pixels weighted based on the smoothed skin score to produce processed pixels for the modified video.

4. The method of claim 2, further comprising detecting a gender of the subject, an age of the subject, or both the gender and the age of the subject,
wherein smoothing the skin of the face of the subject in the video is based on the gender of the subject, the age of the subject, or both the gender and the age of the subject.

5. The method of claim 1, wherein the beauty effects include changing the skin tone of the face of the subject in the video.

6. The method of claim 5, wherein
the averaging operation results in a smoothed skin score, applying the beauty effects to the video comprises:
modifying input pixels from the images to generate modified pixels, and
blending the input pixels with the modified pixels weighted based on the smoothed skin score to produce processed pixels for the modified video.

7. The method of claim 5, further comprising detecting a gender of the subject, an age of the subject, or both the gender and the age of the subject,
wherein changing the skin tone of the face of the subject in the video is based on the gender of the subject, the age of the subject, or both the gender and the age of the subject.

8. The method of claim 1, wherein the beauty effects include slimming the face of the subject in the video.

9. The method of claim 8, further comprising detecting a gender of the subject, an age of the subject, or both the gender and the age of the subject,
wherein slimming the face of the subject in the video is based on the gender of the subject, the age of the subject, or both the gender and the age of the subject.

10. The method of claim 1, wherein the beauty effects include adjusting a size of eyes on the face of the subject in the video.

11. The method of claim 10, further comprising detecting a gender of the subject, an age of the subject, or both the gender and the age of the subject,
wherein adjusting the size of the eyes on the face of the subject in the video is based on the gender of the subject, the age of the subject, or both the gender and the age of the subject.

12. The method of claim 11, wherein the images are captured at thirty frames per second or higher.

13. The method of claim 1, wherein the beauty effects include removing an eye bag from the face of the subject in the video.

14. The method of claim 13, further comprising detecting a gender of the subject, an age of the subject, or both the gender and the age of the subject,
- wherein removing the eye bag from the face of the subject in the video is based on the gender of the subject, the age of the subject, or both the gender and the age of the subject.

15. The method of claim 1, wherein the beauty effects are applied to the images included in the video as the images are captured.

16. The method of claim 1, wherein outputting the video comprises wirelessly transmitting the modified video.

17. The method of claim 1, further comprising augmenting the modified video with at least one filter; and
- providing a strength input value to the at least one filter, the strength input value controlling an intensity of the at least one filter.

18. The method of claim 17, wherein the at least one filter comprises a red lip filter, a face brightening filter, a face whitening filter, a skin smoothing filter, a big eyes filter, a slim face filter, an eye wrinkle remover filter, an eye bag removal filter, and/or a dark eye circle removal filter.

19. The method of claim 18, further comprising detecting a gender of the subject, an age of the subject, or both the gender and the age of the subject,
- wherein augmenting the modified video with the at least one filter is based on the gender of the subject, the age of the subject, or both the gender and the age of the subject.

20. A non-transitory computer-readable medium comprising instructions configured to cause a processor to at least:
- perform facial detection on a video to detect a face of a subject in the video;
- detect a skin tone of the subject based on the face by determining a skin tone likelihood score for each pixel of a plurality of images included in the video and perform an averaging operation on the skin tone likelihood score;
- modify the face of the subject in the video by applying beauty effects to create a modified video; and
- output the modified video.

* * * * *